June 22, 1965  G. RACCUGLIA ETAL  3,190,546
METHOD AND APPARATUS FOR SEPARATING LIQUID MIXTURES
Filed March 27, 1959  9 Sheets-Sheet 1

INVENTORS.
GIOVANNI RACCUGLIA
DAVID L. CHILDS
JAMES J. SHANLEY
BY Shanley & O'Neil
ATTORNEYS.

June 22, 1965 G. RACCUGLIA ETAL 3,190,546
METHOD AND APPARATUS FOR SEPARATING LIQUID MIXTURES
Filed March 27, 1959 9 Sheets-Sheet 2

INVENTORS
GIOVANNI RACCUGLIA
DAVID L. CHILDS
JAMES J. SHANLEY,
BY *Shanley & O'Neil*
ATTORNEY June 22, 1965   G. RACCUGLIA ETAL   3,190,546
METHOD AND APPARATUS FOR SEPARATING LIQUID MIXTURES
Filed March 27, 1959   9 Sheets-Sheet 3
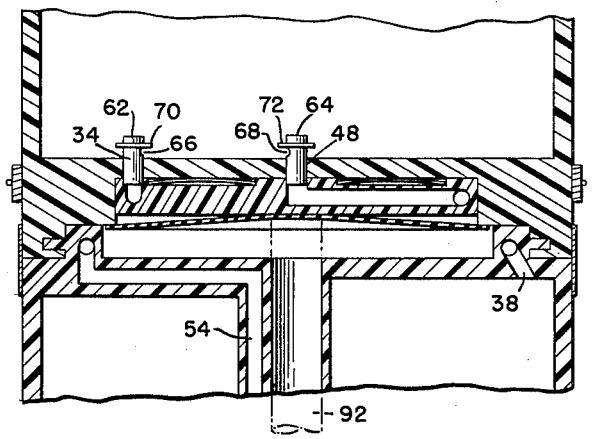
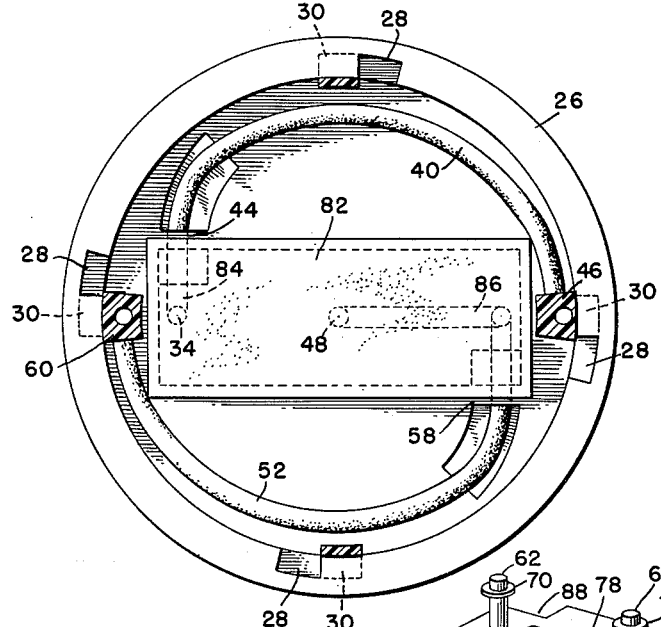
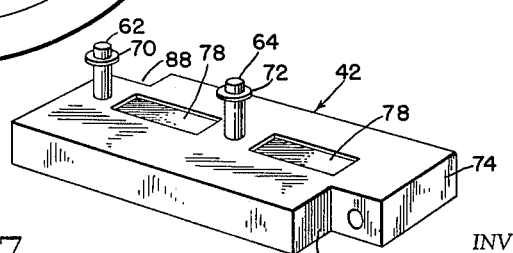
INVENTORS
GIOVANNI RACCUGLIA
DAVID L. CHILDS
JAMES J. SHANLEY
BY Shanley + O'Keil
ATTORNEY June 22, 1965   G. RACCUGLIA ETAL   3,190,546
METHOD AND APPARATUS FOR SEPARATING LIQUID MIXTURES
Filed March 27, 1959   9 Sheets-Sheet 4
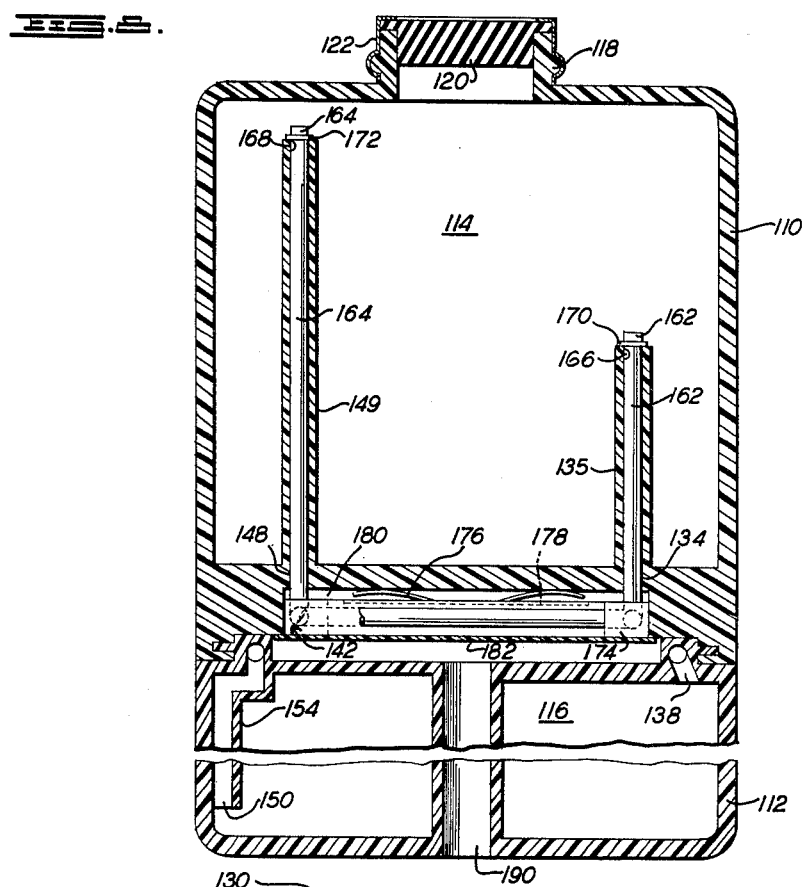
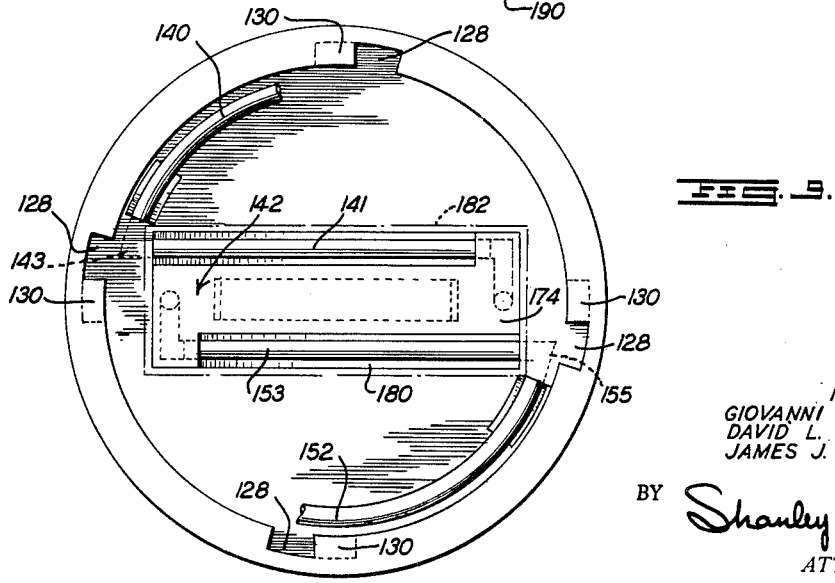
INVENTORS.
GIOVANNI RACCUGLIA
DAVID L. CHILDS
JAMES J. SHANLEY
BY Shanley & O'Neil
ATTORNEYS.

June 22, 1965 G. RACCUGLIA ETAL 3,190,546
METHOD AND APPARATUS FOR SEPARATING LIQUID MIXTURES
Filed March 27, 1959 9 Sheets-Sheet 5
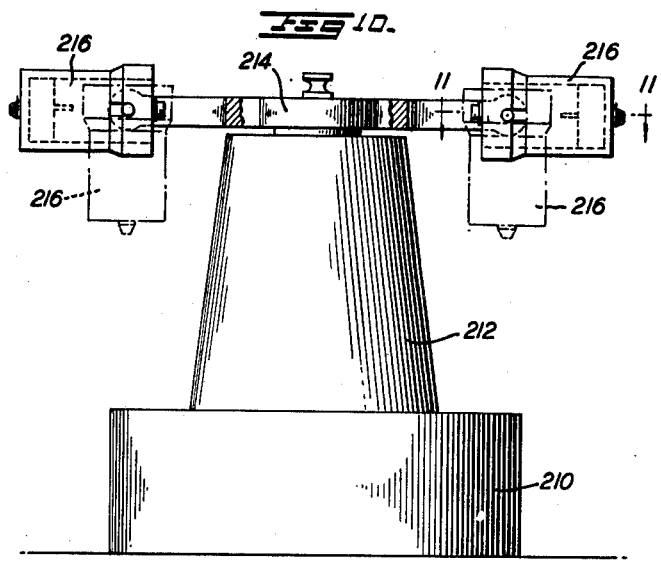
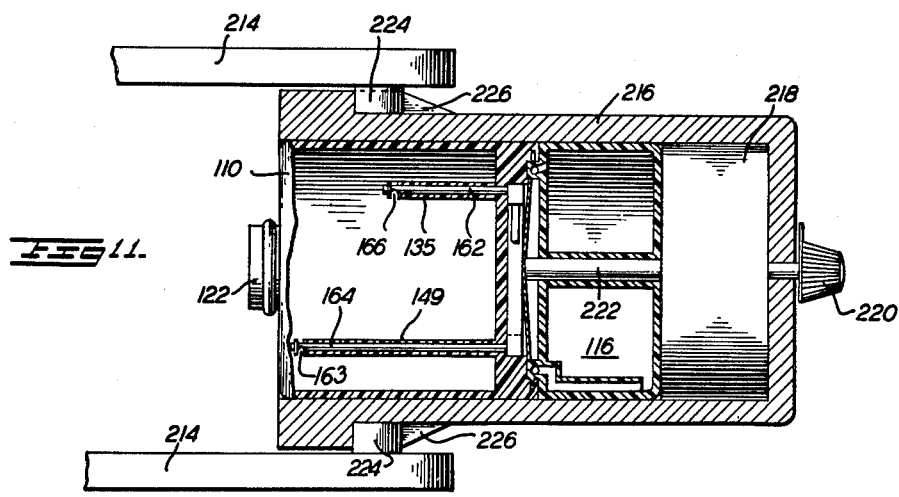
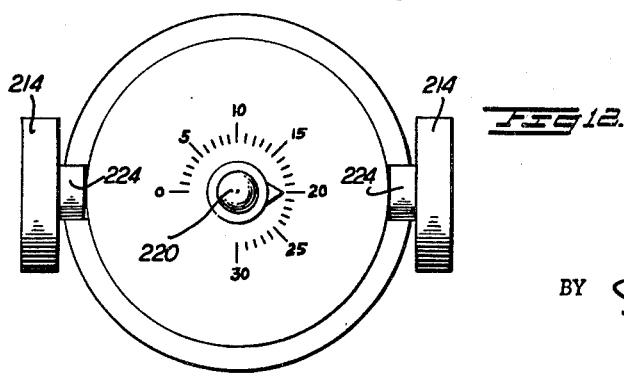
INVENTORS.
GIOVANNI RACCUGLIA
DAVID L. CHILDS
JAMES J. SHANLEY
BY Shanley & O'Neil
ATTORNEYS.

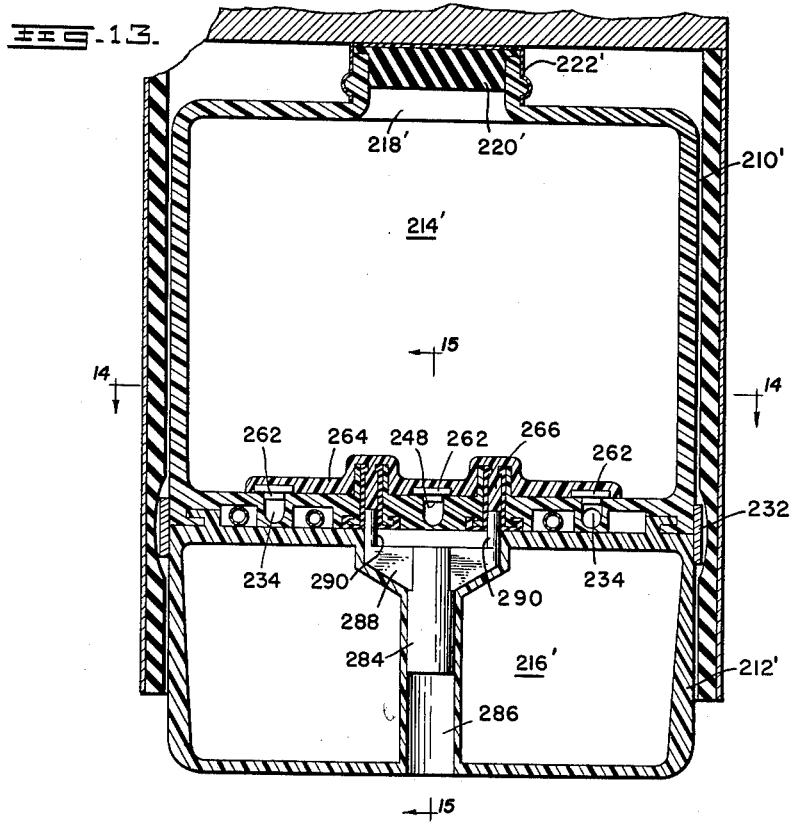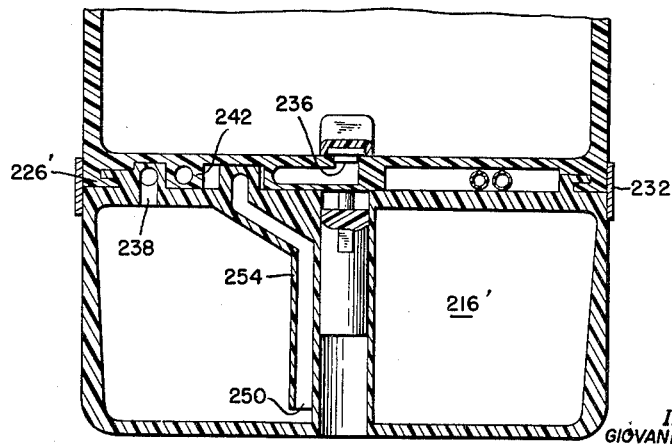

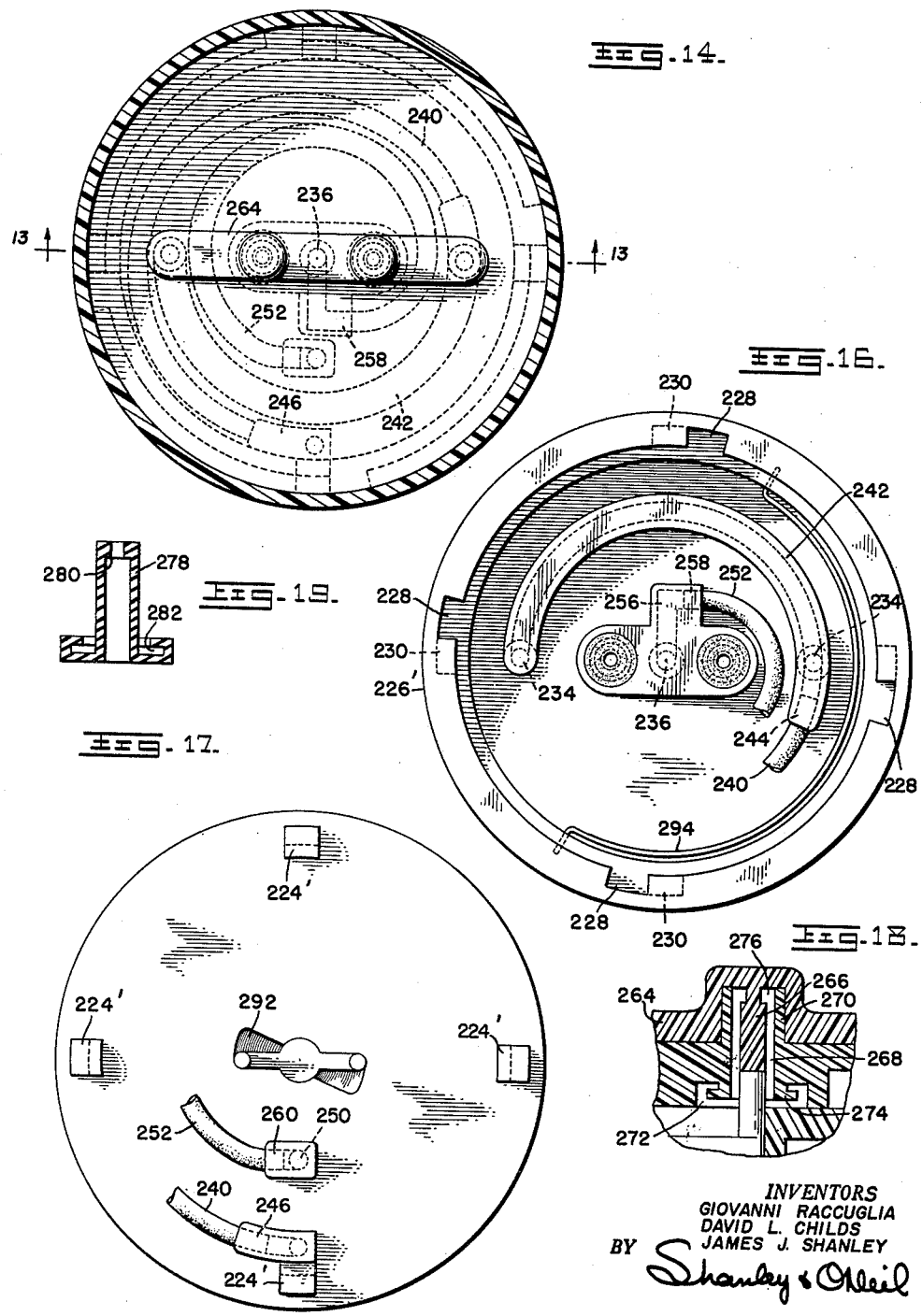

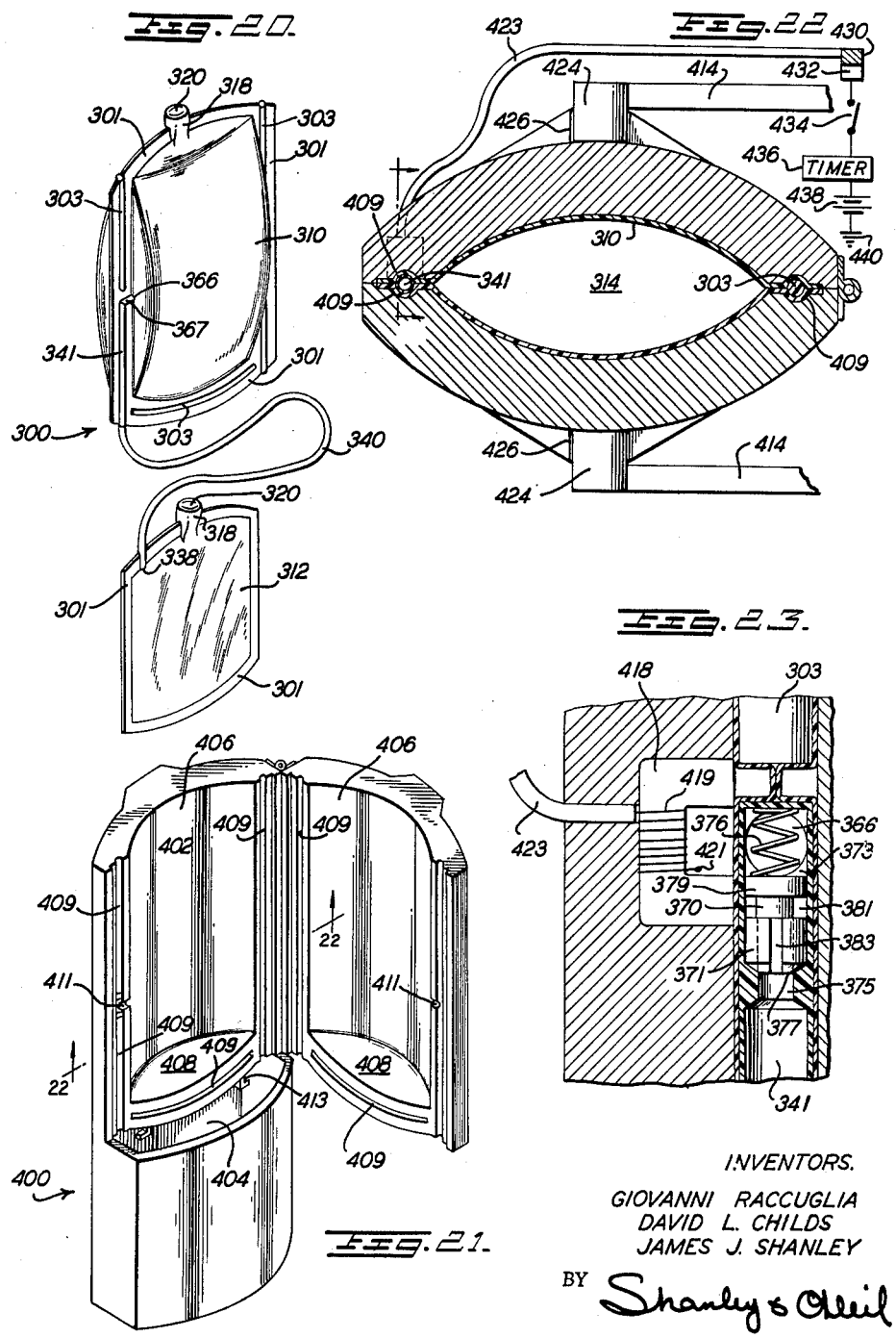

June 22, 1965 G. RACCUGLIA ETAL 3,190,546
METHOD AND APPARATUS FOR SEPARATING LIQUID MIXTURES
Filed March 27, 1959 9 Sheets-Sheet 9
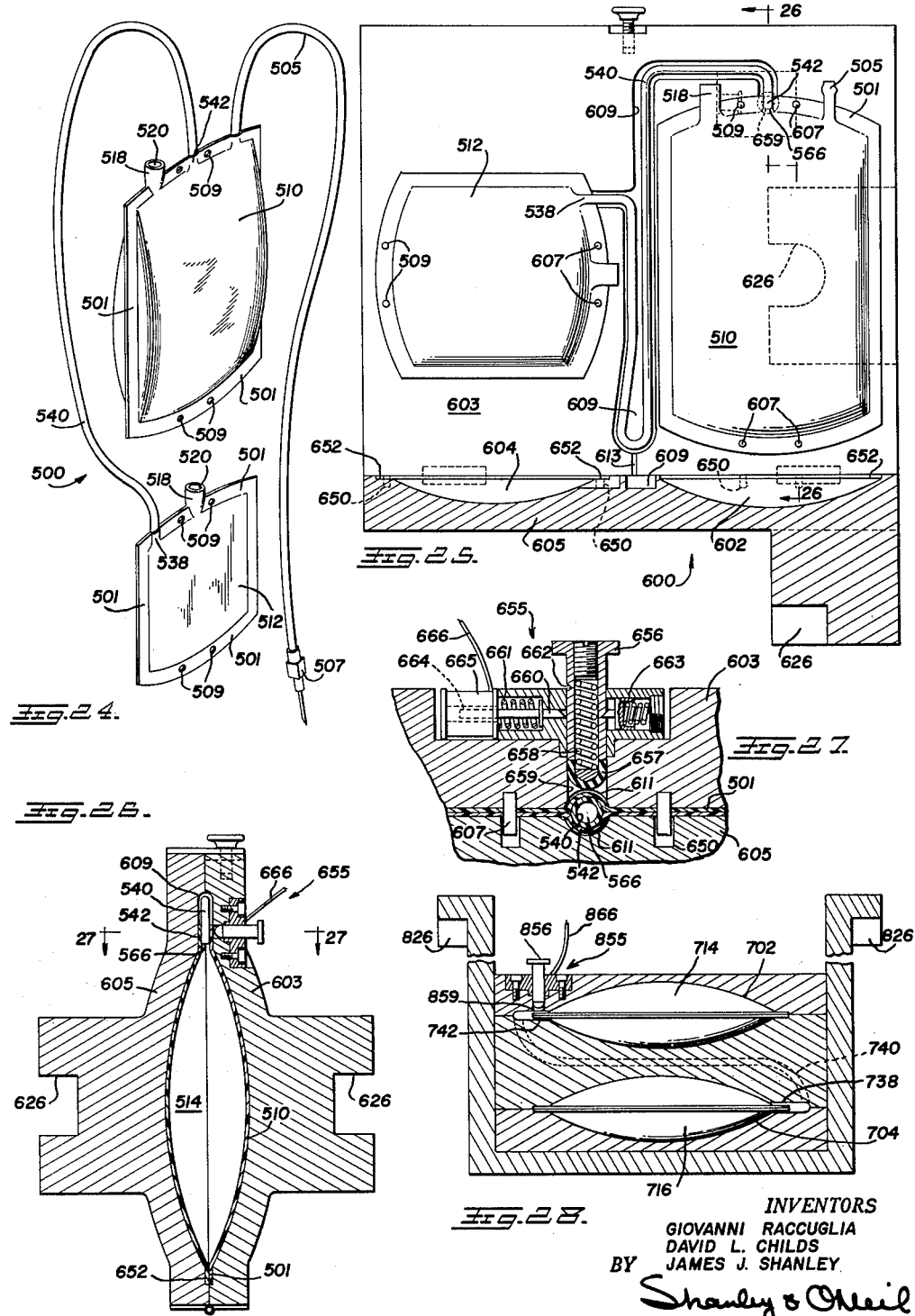
INVENTORS
GIOVANNI RACCUGLIA
DAVID L. CHILDS
JAMES J. SHANLEY
BY
Shanley & O'Neil
ATTORNEYS United States Patent Office 3,190,546
Patented June 22, 1965

3,190,546
METHOD AND APPARATUS FOR SEPARATING
LIQUID MIXTURES
Giovanni Raccuglia, Ann Arbor, and David L. Childs, Birmingham, Mich., and James J. Shanley, Bethesda, Md., assignors of one-third to Giovanni Raccuglia, one-third to David L. Childs, and one-third to James J. Shanley
Filed Mar. 27, 1959, Ser. No. 802,398
21 Claims. (Cl. 233—20)

This application is a continuation-in-part of applicants' copending application Serial No. 786,579 filed January 13, 1959, which is a continuation-in-part of applicants' copending application Serial No. 781,136 filed December 17, 1958, which in turn is a continuation-in-part of applicants' copending application Serial No. 730,640, filed April 24, 1958, all now abandoned.

The present invention relates to the centrifugal separation of liquids. More particularly the present invention relates to a new method and system for separating liquids by centrifugation and storing separated components. Further the present invention involves a new method and system for collecting and centrifuging liquids and for storing and dispensing separated components. The new system of the present invention utilizes a new machine and new articles of manufacture.

The invention has utility in the collection and centrifugal separation of a variety of liquid mixtures having immiscible components and in the separate storage of separated components, particularly in the handling of biological materials. Examples of the handling of biological materials enhanced by this invention are the preparation of nutrient media, tissue fractionation, and the research fractionation of milk and the separation of virus and bacteria therefrom. Perhaps the chief utility of the invention is in collection and separation of whole blood and storage of blood components, and the invention will be illustrated by way of example in this connection.

As is well known, whole blood is a fluid tissue comprised of a variety of solid particles suspended in colloidal plasma. Chief among the suspended particles are the red cells, the white cells, and the platelets. Suspension of the solid particles is maintained by vascular circulation in a parent organism. Whole blood is not a true dispersion, as evidenced by the spontaneous sedimentation of quiescent blood.

Accordingly, it is not difficult to effect a gross separation of several of the formed elements of blood from each other and from the plasma by centrifugation, which is nothing more than accelerated sedimentation. Such separation has great utility in a number of biological applications, such as plasmapheresis, relief of thrombocytopenia and hemophilia, and so on.

For the past twenty-five years or so, it has been widespread practice to collect fresh donor blood and to store it in admixture with an anticoagulant such as acid citrate dextrose solution or other calcium complexing agents, for reinfusion when needed. However, a number of difficulties have attended this procedure. In the first place, the equilibrium state of cell destruction and resynthesis which exists in the human body does not obtain is stored blood. The various components of stored whole blood have different survival times, and the useful life of stored blood for certain purposes is largely limited to these survival times. The example, the platelets have an ordinary survival time of only a few days.

More recently, it has been found that platelet survival can be greatly extended, with good viability, if the platelets are separately stored, as in a simple gelatin solution and at reduced temperature. Not only is the survival time of certain blood components extended by separate storage, but also the remaining components of ordinarily long survival may be separately stored for long periods without special treatment other than refrigeration.

Another difficulty arising from the use of whole blood stored with anticoagulant is encountered in those therapies in which an excessive volume of anticoagulant is contraindicated. In such cases, partial experimental evidence indicates that the prompt separation of the blood components may remove or greatly reduce, where possible in respect to other conditions, the need for anticoagulant. The platelets may be roughly considered to be coagulating agents, inasmuch as upon lysis they liberate accelerators for the transformation of prothrombin to thrombin and for the conversion of fibrinogen to fibrin by thrombin. Hence, the separation of blood components followed by reconstitution minus platelets should result in the production of a blood which has less tendency to coagulate in the absence of anticoagulants.

These and other applications render the fractionation of blood of great importance.

In the past, separation has been achieved largely by one of three methods. In the earliest method, blood obtained by phlebotomy was collected in a closed and evacuated donor bottle and then transferred from the bottle to a centrifuge. This method had the advantage that the only equipment needed at the time of phletobomy was a simple donor bottle and donor kit. The centrifuge could be centrally located and could handle the contents of a number of bottles during the time consumed by a single phlebotomy. Separation was followed by bulk storage and/or packaging of the separated fractions for therapeutic use. Simple as this method was, it suffered from the great disadvantages that asepsis could be maintained only with the greatest difficulty and that the frothing induced during handling increased the danger of embolism.

In recent years, a system for blood separation has been developed in which fresh donor blood passes directly from the donor through a closed system including a centrifuge. This new system has largely overcome the problem of turbulence and provides closed-system sterility, but it has necessitated the use of costly equipment which can be employed in conjunction with only a single phlebotomy at a time. Unless donors are meticulously scheduled so that a plurality of the same blood type are processed sequentially, then this equipment must be cleaned after each phlebotomy to prevent the mixing of blood types.

Still more recently, the fractionation of blood has been carried out on a commercial scale using plastic bags in which the red cell fraction and the plasma fraction are separated either by sedimentation or by centrifuging. The plasma fraction is then expelled from the bag by squeezing. However, this plastic bag technique as presently practiced has many inconveniences, principally that the segregation of the two fractions after separation is a slow and burdensome procedure.

By the present invention, there is provided for the first time a device which combines the simplicity and low cost of the earlier equipment with the closed-system asepsis and freedom from excessive handling of the later equipment. Preferably, these results are achieved by providing a bottle which is both a receptor bottle and a centrifuge chamber with provision for withdrawing a separated component. Further, this bottle may be compartmented and provided with means for selectively segregating or detaching certain of the compartments from each other, so that the cycle from hemolation to infusion may be carried out entirely within the bottle. In the case of application of the device of the present invention to the handling of toxic biological materials, the closed system provided by the invention is equally important for protection against contact with or escape of the toxic materials handled.

Accordingly, it is an object of the present invention to provide a method, hand portable container and centrifuge for the centrifugal separation of liquids, which will permit separation of the liquids into two or three components in a closed system.

Another object of the present invention is the provision of a hand portable container for the centrifugal separation of liquids, which will permit separation and segregation within the container of a component having a specific gravity intermediate that of two other components.

Another object of the present invention is the provision of a hand portable container for the centrifugal separation of liquids, in which three components may be separated and the components of greatest and least specific gravity reconstituted to the exclusion of the component of intermediate specific gravity, all within the container.

Another object of the invention is the provision of a hand portable container which will provide, in a closed system, a receptor for liquids, a centrifuge for the separation of the liquids, and a dispenser for separated components.

Another object of the invention is the provision of a hand portable container for the centrifugal separation of liquids into a plurality of components and having provision for the segregation of at least one of the separated components in a closed compartment detachable from the remainder of the container.

Another object of the invention is the provision of a hermetically sealed and evacuated hand portable container into which biological fluids may be drawn by suction, centrifugally separated, and a separated component withdrawn from the container, all in a sterile system.

Another object of the invention is the provision of one or more of the foregoing functions in a hand portable container which is of such low cost that it is disposable after one use.

Other objects and advantages of the present invention will become apparent from a consideration of the following description, taken in conjunction with the accompanying drawings, in which:

FIGURE 5 is a top plan view of the lower section of the bottle;

FIGURE 6 is a fragmentary view in section taken along the line 1—1 of FIGURE 2 with the valve insert moved to open position;

FIGURE 7 is a detail view in perspective of the valve insert;

FIGURE 8 is a view in section corresponding to FIGURE 1 but of a modification of the invention;

FIGURE 9 is a bottom plan view of the upper section of the bottle of FIGURE 8;

FIGURE 10 is a view in side elevation of a centrifuge system embodying the principles of the present invention;

FIGURE 11 is a fragmentary view in section taken on the line 11—11 of FIGURE 10 showing the bottle of FIGURE 8 in centrifuging position;

FIGURE 12 is a view in side elevation of the centrifuge cup in the position of FIGURE 11;

FIGURE 13 is a view in section of a modified form of bottle embodying the present invention, taken on the line 13—13 of FIGURE 14, with a centrifuge head added;

FIGURE 14 is a view in cross-section taken on the line 14—14 of FIGURE 13 without the centrifuge head;

FIGURE 15 is a fragmentary view in section taken on the line 15—15 of FIGURE 13 without the centrifuge head;

FIGURE 16 is a bottom plan view of the upper section of the bottle of FIGURE 13 with the lower section removed;

FIGURE 17 is a top plan view of the lower section of the bottle of FIGURE 13 with the upper section removed;

FIGURE 18 is an enlarged fragmentary detail view of the bottle of FIGURE 13 with a part omitted for clarity;

FIGURE 19 is an enlarged detail view of an element of the bottle of FIGURE 17;

FIGURE 20 is a perspective view of a two-part bottle constituting a modification of the invention;

FIGURE 21 is a view in perspective of a centrifuge cup in accordance with the present invention for use in a centrifuge of the general type illustrated in FIGURE 10 for handling the bottle of FIGURE 21;

FIGURE 22 is an enlarged view in section on the line 22—22 of FIGURE 21 but with the cup closed on a bottle and mounted in a centrifuge head;

FIGURE 23 is an enlarged fragmentary detail view of the valve and valve operating mechanism taken on the line 23—23 of FIGURE 22;

FIGURE 24 is a perspective view of a two-part bottle constituting a further modification of the invention;

FIGURE 25 is a side elevation view of a special centrifuge element in open position with one hinged element in section and with the blood bottle of FIGURE 24 positioned therein;

FIGURE 26 is a view in section taken on the line 26—26 of FIGURE 25;

FIGURE 27 is a view in section taken on the line 27—27 of FIGURE 25; and

FIGURE 28 is a diagrammatic view of a further modification.

Figure 1:
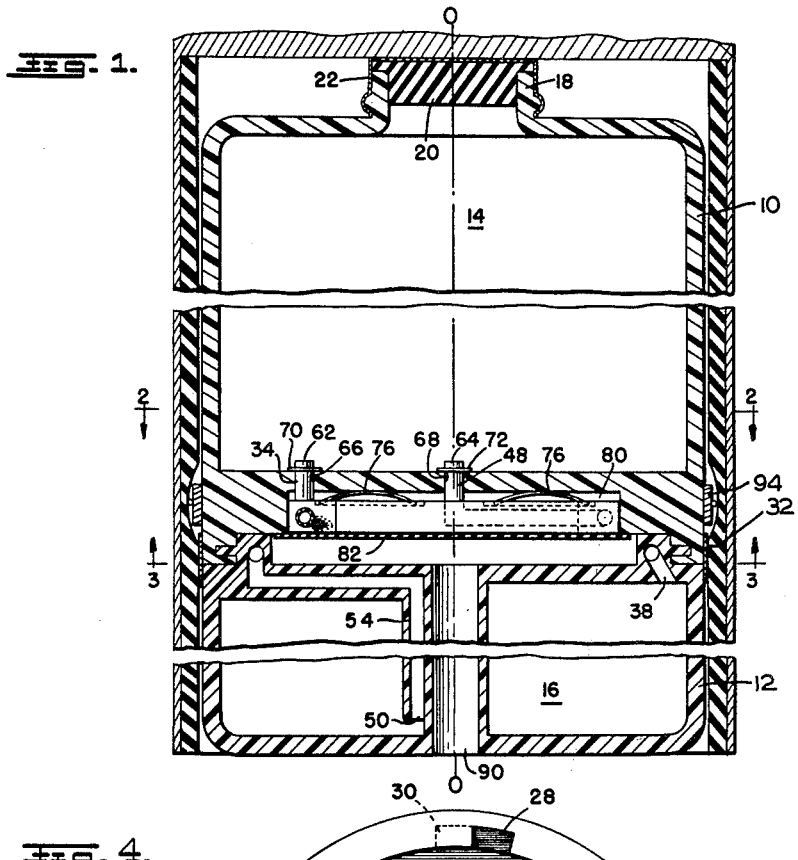
FIGURE 1 is a view in section, taken along the line 1—1 of FIGURE 2, of a bottle incorporating the present invention with the valve member shown in elevation with a centrifuge head added.
Figure 4:
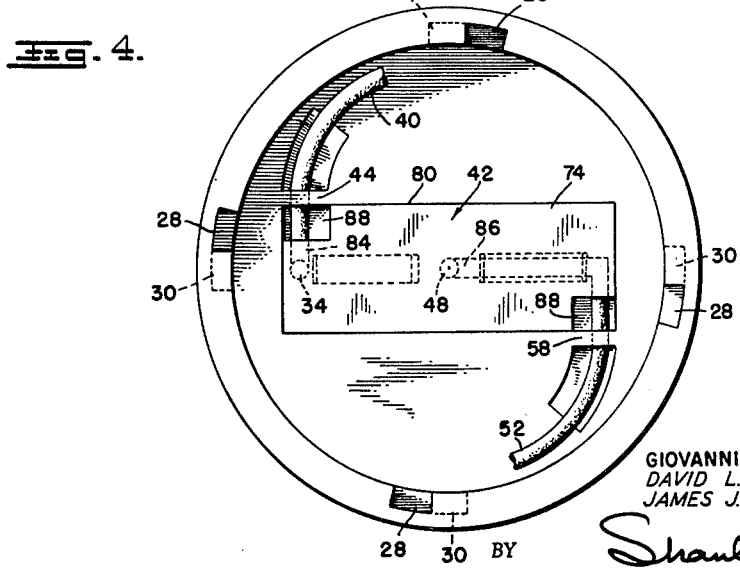
FIGURE 4 is a bottom plan view of the upper section of the bottle.
Figure 2:
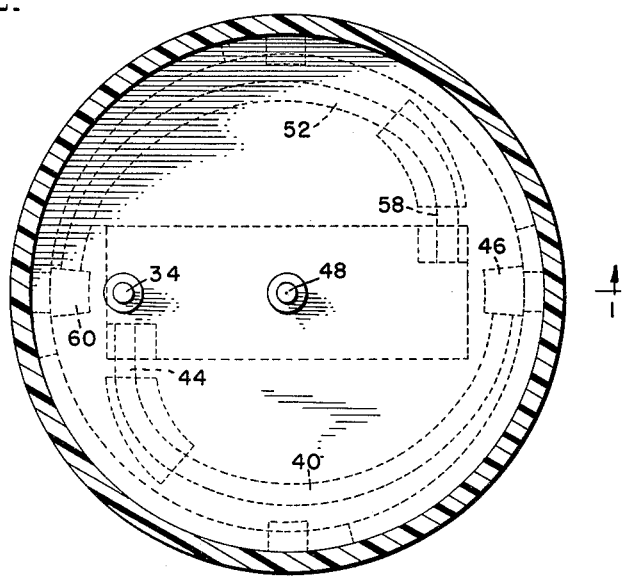
FIGURE 2 is a view in cross-section taken on the line 2—2 of FIGURE 1 without the centrifuge head.
Figure 3:
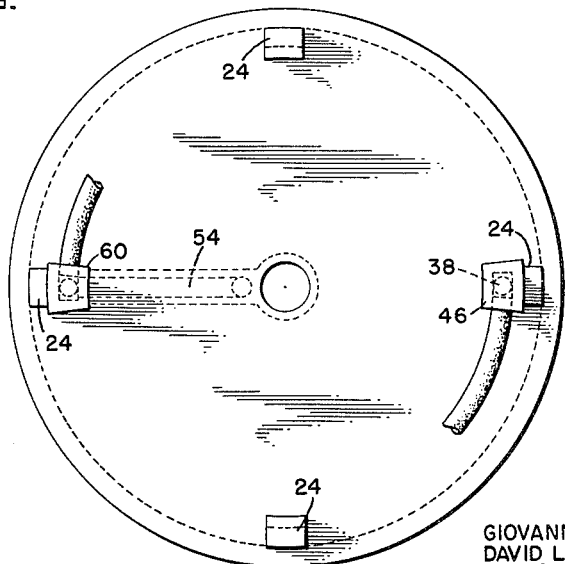
FIGURE 3 is a view in cross-section taken on the line 3—3 of FIGURE 1 without the centrifuge head.

Referring now to the drawings in greater detail, and to the modification of FIGURES 1–7, inclusive, there is shown a hand portable container in accordance with the invention in the form of a blood donor bottle. This bottle is made up of two sections 10 and 12 enclosing compartments 14 and 16, respectively. The main compartment 14 is for the reception, centrifugal separation, storage, and dispensing of fresh whole blood or fraction thereof. At the upper end of section 10 is a neck 18 closed by a hollow needle penetrable, self-sealing plug 20 which in turn is covered by the conventional metal seal or cap 22.

Sections 10 and 12 are separable from one another and are held together by a bayonet-type connection. This connecting means is formed by spaced lugs 24 on the top face of lower section 12 and complementary lug receiving openings carried by the bottom face of upper section 10. In the latter case, an integral annular ring 26 is formed on the lower face of the upper section 10 and this ring has notches 28 and camming slots 30 for receiving and frictionally holding lugs 24 in the conventional manner of bayonet connections. The foregoing connecting means between sections 10 and 12 hold these sections against relative rotation, but in order to assure such a connection an adhesive tape 32 may be applied around the bottle in overlapping relation to both sections.

An opening 34 is formed in the bottom of compartment 14 in radially spaced relation with respect to the vertical central axis of the bottle. In the top of bottom section 12 an opening 38 is formed. Openings 34 and 38 are parts of a continuous passageway between compartment 14 and compartment 16, which passageway includes a length of flexible tubing 40 and connections on the opposed faces of sections 10 and 12. The connection on the bottom face of section 10 includes a unitary valve member indicated generally at 42 and described in detail below and a tube anchor 44 snugly embracing one end of tube 40. On the top face of section 12 there is an adapter in the form of an integral member 46 receiving the other end of tube 40 which happens to coincide circumferentially with one of the lugs 24.

The bottom of compartment 14 also has an opening 48 on the central axis of the bottle. Compartment 16 has an opening 50 near its bottom and opening 50 and opening 48 form part of a continuous passageway which includes flexible tubing 52 and rigid pipe 54 within compartment 16. This passage also includes a unitary valve member 42 on the bottom of section 10 and tube anchor 58 similar to tube anchor 44. At the section 12 end, this same passage includes an adapter 60 receiving the other end of flexible tube 52.

Openings 34 and 48 in the bottom of compartment 14 include as a functional part thereof two rigid projecting tubular members 62 and 64, respectively, which themselves have side openings 66 and 68, respectively, communicating with the conduits presented by the hollow interiors of these members. At its upper end, each projecting tubular member 62 and 64 is closed and carries an encircling flange 70 and 72, respectively, which is larger than the associated hole 34 and 48. Flanges 70 and 72 are formed of deformable material so as to act in sealing relation with the bottom of compartment 14 to seal off holes 34 and 48 when tubular members 62 and 64 are in their extreme lower position. As shown in FIGURE 6 when tubular members 62 and 64 are in their uppermost position, openings 66 and 68, and therefore the conduits formed by tubular members 62 and 64 are in communication with the interior of compartment 14. From the foregoing it will be apparent that tubular members 62 and 64, in conjunction with flanges 70 and 72, perform the functions of valves.

Projecting tubular members 62 and 64 are rigidly mounted on a movable valve carrier 74. The top surface of valve carrier 74 has mounted thereon a pair of leaf springs 76, 76 in a pair of recesses 78, 78. Valve carrier 74 is movably mounted in a downwardly opening cavity or chamber 80 which is hermetically sealed by a lower wall formed of resilient or flexible sheet material 82. Wall 82 and springs 76, 76 cooperate to bias valve carrier 74 to an extreme downward position in which openings 34 and 48 are closed by sealing flanges 70 and 72. Where wall 82 is sufficiently resilient, springs 76, 76 may be omitted. The purpose of the hermetic sealing function of sheet 82 is to present a movable valve operator which can be maintained sterile while being actuatable from the exterior of section 10 of the bottle.

The continuous passageways formed by and between the openings 34 and 48 in the bottom of compartment 14 and the openings 38 and 50 in compartment 16 include, in addition to the elements already described, conduits in the valve carrier 74. Thus, the lower open end of each projecting tubular member 62 and 64 is connected in communication with a conduit 84 and 86, respectively, in valve carrier 74. Each flexible tube 40 and 52 passes through its respective tube anchor 44 and 58 in hermetic sealing relation and is sealingly received in the outlet end of the corresponding conduit 84 and 86. This leaves a short section of flexible tubing bridging the cut-out portions 88 of valve carrier 74 which are designed to permit movement of member 74 by way of the flexibility of the tubing. To make valve carrier 74 accessible for movement from the exterior of the bottle, a passage 90 is formed in section 12. Through passage 90, any convenient instrument 92 can be inserted to move valve carrier 74 to its extreme upper position. Any simple form of valve and valve operator may be substituted.

A bail ring 94 is included on the lower portion of section 10 for mounting a swingable bail useful when this section of the bottle is being utilized for an infusion. Although section 10 has been termed the upper section in this description and section 12 the lower section, it will be apparent that the bottle can be inverted where desired.

Thus far, there have been described all the parts which would normally come into contact with a liquid to be separated or a separated fraction of liquid. These parts may be made of or coated with a substance which is relatively non-wetting. In the handling of whole blood, it has been found that lysis and fragmentation of the formed elements are reduced, with a concomitant improvement in survival and viability, by the provision of non-wetting surfaces. Accordingly, a rigid plastic such as a transparent acrylic resin may be used for the portions of the bottle in contact with the liquids, with flexible plastic tubes such as neoprene tubes used as conduits 82 and 94. Alternatively, if a bottle having glass and metal and rubber parts is used, these parts may be coated with a conventional non-wetting compound such as any of a variety of silicones.

An example of the use of a bottle embodying the present invention will now be described in connection with the handling of blood.

The stoppered and pyrogen-free bottle with the parts assembled as shown in FIGURE 1, including adhesive tape 32, is stored ready for use when needed. Such a bottle would have been previously sterilized. It would also usually have been evacuated with valves 66 and 68 held open during the evacuation process. The sterilized, evacuated and sealed bottles may be stored in large numbers in hospitals and other blood donor centers.

The bottle is used for a phlebotomy in the same manner as a conventional bottle. The blood collects in compartment 14 and cannot flow into compartment 16 because valves 66 and 68 are maintained in closed position against the vacuum by the resiliency of spring elements 76 and sheet 82. When the desired quantity of blood has been collected, the donor tube adapter is removed from stopper 20 and the self-sealing material of the stopper immediately seals the interior of bottle 10. The bottle may now be put into a conventional centrifuge, preferably in an inverted position, and is spun about its vertical axis for the usual period of time and at the usual speed. During this centrifuging operation the blood is held against the inside walls of section 10 and under the influence of centrifugal force the red cells migrate radially outwardly toward the side walls. The plasma and platelets are thereby forced inwardly toward the axis of rotation. The time comes during centrifuging when the red cells, together with some white cells, have collected in an annular body hugging the side wall of section 10 and the plasma and platelets have collected in an annular body disposed inwardly thereof with a more or less definite cylindrical interface between the two bodies. The opening 34 is positioned so that it is disposed radially inwardly of the body of red cells, a distance equal to the thickness of a safety layer of plasma to assure the absence of red cells over the opening. At this time, the attendant inserts any convenient device 92 into cavity 90 and pushes down on valve carrier 74 to institute the second phase of the centrifuging. This opens valves 66 and 68, placing the compartment 16 in communication with the compartment 14. The centrifugal forces acting on and within the body of the liquid in compartment 14 force all the liquid disposed radially inwardly of opening 34 into compartment 16. Valve 68, tubing 52 and opening 50 act to equalize gas pressure in the compartments 14 and 16. Valve 66 may then be closed. A separation of red cells and plasma has been thus accomplished and if this is the desired end centrifuging is terminated. If platelets are desired, the centrifuging may then be continued in a third phase at the same speed for a longer period of time or at a higher speed for a period of time necessary to separate the platelets. When the platelets have collected on the side walls of section 12 the centrifuging can be stopped. If the plasma is to be separately stored, valves 66 and 68 will be left closed. Otherwise, they can be left open during the third phase of the centrifuging or reopened at any time after stopping the centrifuge. The plasma drains back into compartment 14 to mix with the red cells and any white cells therein. In either case, before separating the two sections of the bottle, valves 66 and 68 are allowed to close. Adhesive tape 32, if present, is removed.

A centrifuge head in the form of a cup is indicated at 96 which, by means of a resilient lining 98, receives and snugly holds bottle 10 against relative rotation while the centrifuge head is rotated around axis 0—0. In normal operation the open end of the cup of centrifuge head 96 faces upwardly.

The tubes 40 and 52 are each clamped off in two places and then cut between the clamps or an intermediate section of each tube can be thermally fused and the cut made in each fused section. In either event, the sections are separated with all the tubes sealed so that each section is entirely sealed. Then, either or both sections of the bottle can be separately used immediately or separately stored.

Thus, it will be seen that in separable section 12 a fraction may be collected made up of the platelets alone or the platelets suspended in plasma or the platelets separated from but in contact with plasma and that when section 12 is detached from the remainder of the bottle 10, the substance in this section may be stored for removal later in a pyrogen-free condition. It will also be noted that in the remainder of bottle 10 a fraction made up of the red cells alone may be stored or in suspension in platelet-free plasma or in suspension in any other medium for removal later, as by direct transfusion, in a pyrogen-free condition. Obviously, the bottle of the present invention is ideally suited for plasmapheresis.

In the collection and fractionation of blood the compartment 14 may have the volume of the usual 500 cc. phlebotomy bottle. With the usual 75 cc. of anticoagulant included the opening of valve 66 is positioned so as to be in a vertical line coinciding with the inner boundary of a wall of liquid measuring in volume about 260 cc. This allows a safety layer of about 10 cc. with all the red cells when separated outside of this boundary. Of course in some cases a smaller fraction of the plasma present may be ejected into compartment 16 by having valve opening 66 closer to the vertical axis of the bottle. It is important that valve opening 66 not be radially spaced from the vertical axis of the bottle to such an extent that red cells are ejected into compartment 16. If the bottle were completely full of blood, including any anticoagulant added, the boundary between the red cell layer and the plasma cell layer would be very slightly more than 5/7 of the radial distance from the vertical axis of the bottle to the vertical walls of compartment 14. In present practice the bottle is not full and therefore, in designing cylindrical bottles for handling blood in accordance with FIGURES 1–7, inclusive, valve opening 66 should not be a radial distance less than about 5/7 of the radial distance from the vertical axis of the bottle to the vertical walls of compartment 14 in order to obtain ejection of the largest possible fraction of plasma free of red cells.

Where desired, the bottle of FIGURES 1 to 7, inclusive, can have its walls formed of flexible plastic material so long as valve 66 and the passageway connecting the compartments are supported in proper position during centrifuging. In such case, the bottle before use is in collapsed condition and the donor's blood is introduced into the bottle by gravity or drawn into the bottle by spring or weight devices in known manner. Since the centrifuge sidewalls during centrifuging support the bottle and since centrifugal force ejects the plasma fraction upwardly into compartment 16, the flexibility of the walls of the bottle would not prevent it from functioning in a satisfactory manner.

FIGURES 8 and 9 disclose a bottle in accordance with the present invention which is designed to be revolved around an axis of revolution with the vertical axis of the bottle as shown in FIGURE 8 normal to the axis of revolution and the neck 118 pointing toward the axis of revolution. It will be apparent that in such case the separation of the red cell fraction and the plasma fraction will result in a boundary or interface normal to the vertical axis of the bottle as shown in FIGURE 8 with the red cell fraction held against the bottom of compartment 114. Only slight modification of the bottle of FIGURES 1 to 7 is necessary to accomplish the purposes of this modification and therefore the bottle of the modification of FIGURES 8 and 9 can be considered as being identical with that of FIGURES 1 to 7, inclusive, except where pointed out below. To simplify this description, parts in FIGURES 8 and 9 identical with parts in FIGURES 1–7, inclusive, are given identical reference numerals plus 100.

Instead of the valve openings 166 and 168 in this modification being radially positioned to accomplish the purposes of the invention, these valves are spaced above the bottom of compartment 114. Thus, extensions 135 and 149 must carry openings 134 and 148 upwardly to the desired points above the bottom of compartment 114. Correspondingly rigid projecting tubular members 162 and 164 project upwardly so that the valves presented by openings 166 and 168 and flanges 170 and 172 are positioned at the desired points within compartment 114. In the case of a full blood bottle, extension 135 would terminate in the neighborhood of halfway up the bottle or at a point at the upper boundary of a safety layer of 10 cc. resting on the top of a separated red cell fraction. With present practice, valve 166 would be less than halfway up with the bottle less than full of blood. Extension 149 will extend upwardly to a point above the normal top liquid level in compartment 114. Since the radial location of valve openings 166 and 168 are not important, the valve member 142 is shown balanced with the rigid projecting tubular members 162 and 164 equally spaced from the vertical axis of the bottle. It will be apparent that any convenient arrangement can be used to achieve the proper vertical location of openings 166 and 168. FIGURE 9 shows that the arrangement permits the use of elongated flexible tubular members 141 and 153 which permit movement of the unitary valve member 142 while maintaining the continuity of the hermetically sealed passageway between openings 166 and 168 and flexible tubing members 140 and 152. The adjacent ends of flexible tubing 140 and 141 are sealingly received by passageway 143 in the bottle material and the adjacent ends of flexible tubing 152 and 153 are sealingly received in a similar opening 155. Since the center of gravity of the bottle of this modification need not coincide with the vertical axis of the bottle, pipe 154 is disposed peripherally and since platelets collect on the bottom of compartment 116 in the position shown in FIGURE 8, opening 150 is spaced off the bottom.

FIGURES 10, 11 and 12 show the bottle of FIGURES 8 and 9 in a special centrifuge. The base 210 and motor 212 of the centrifuge are conventional as is centrifuge head 214. A large centrifuge cup 216 has its lower end modified to receive a timing device 218 with an accessible control knob 220 on the exterior of the bottom of the cup. Timing device 218 carries a plunger 222 which in inoperative position is partly withdrawn into the timer 218 and out of contact with flexible sheet 182 of the bottle. In FIGURE 11, for purposes of illustration, the plunger 222 is shown in operative position against flexible sheet 82 and urging unitary valve member 142 into valve opening position.

Cup 216 is pivotally supported on trunnions 224, the trunnions being slidably received in recesses 226 on the sides of the cup in conventional manner.

FIGURE 10 in solid lines shows the position of a pair of cups holding bottles in accordance with the present invention during centrifuging. In dashed lines are shown the positions of the cups with the centrifuge stopped. FIGURE 11 shows the position of the parts during centrifuging after the timer has actuated the valves by movement of plunger 222.

The bottle of the modification of FIGURES 8-12, inclusive, is used in the same manner as that of the previously described modification. After the phlebotomy, the whole blood is in compartment 114, the valves 166 and 168 being closed and thereby preventing the blood from passing into compartment 116. Two or more blood bottles which may contain the usual 500 cc. of blood plus any necessary anticoagulant are dropped into cups 216. At this point plunger 222 has been retracted into inoperative position. Since the bottles snugly fit into the cups, the protruding portion of plunger 222 is received without interference in opening 190. Timer 218 is set at the desired period of centrifugation and the centrifuge is started. When the centrifuge is up to speed, the cups and bottles are held in the position shown in full lines in FIGURE 10 and the red cell fraction migrates toward the bottom of compartment 114 and away from the axis of revolution. At the end of the period constituting the first phase of fractionating, timer 218 operates to urge plunger 222 against flexible sheet 182 and unitary valve member 142. This opens valves 166 and 168. Since valve 166 is positioned slightly inwardly, relative to the axis of revolution, of the interface between the red cell fraction and the plasma fraction, the thickness of the safety layer, plasma free of red cells is ejected by centrifugal force into compartment 116. The centrifuge can then be slowed down to a stop and as the speed decreases the cups and bottles gradually approach the position shown in broken lines in FIGURE 10. The red cell fraction is held against the bottom of compartment 114 during the deceleration and therefore the separation between the fractions is maintained. If desired, the timer can retract plunger 222 a few seconds after its initial operation to allow valves 166 and 168 to close before the centrifuge slows down. Instead, where desired, the resilience of spring 176 may be enough to close valves 166 and 168 as the speed of the centrifuge decreases thereby lifting the bottle slightly in the cup. With valve 166 closed, any slight jerk in the centrifuge deceleration would not cause slopping of the red cell fraction into compartment 116. In any event, as soon as the bottle is lifted out of the cup, spring 176 automatically closes valves 166 and 168. Where separation of platelets from the plasma is desired, the centrifuge need not be stopped after the second phase of operation and the third phase, as in the preceding modification, involves further centrifuging to separate the platelets as a pack, this time on the bottom of compartment 114. Again, when the platelet pack has separated, the centrifuge can be decelerated as described above and the bottle removed and handled as in the previous modification.

Where desired, timer 218 may be omitted and after the separation of red cell fraction from plasma fraction has been achieved within compartment 114, the centrifuge may be decelerated and gradually brought to a stop. The cups and bottles are then in the position shown in broken lines in FIGURE 10 and the separation of red cell fraction and plasma fraction is maintained. The bottle is carefully lifted out of the cup and maintained in the same vertical position. Any suitable instrument is inserted into opening 190 to move the valve member 142 and open the valves. When the plasma fraction has flowed by gravity into compartment 116, valves 166 and 168 are allowed to close. The bottle sections can now be separated as described earlier in respect to the previous modification. If platelet separation is desired the bottle is again placed in cup 216 and centrifuging again initiated. When the platelet pack is formed, the centrifuge is decelerated and the bottle is handled as before.

Where the compartments 14 and 114 are not full of blood when centrifuged, as is the present practice, any convenient indicia on the bottle can be used to indicate the proper depth of blood to be taken from the donor into these compartments. The proper location of valve openings 66 and 166 is arrived at by recognizing that about 45 percent of the volume will normally be occupied by the red cells and the safety layer. In such case, these valve openings are positioned so as to withdraw not more than 55 percent of the liquid as lighter fraction after separation. With improvements in the technique of handling blood, it may be possible in the future to collect and handle blood without the liquid coagulant now used and in such case these valve openings would be located so as to withdraw less of the liquid as lighter fraction after separation to prevent the contamination of the ejected lighter fraction with red cells. It will be understood that less than all the plasma fraction may be withdrawn so long as the amount of plasma remaining in compartments 14 and 114 is not objectionable in the further processing of the heavier fraction and the lighter fraction. Thus, practical limits of the amount of withdrawn plasma fraction may range between 25 percent and 55 percent where the liquid mixture is blood. In the case of other liquids, it would be mechanically impractical to withdraw less than 10 percent or more than 90 percent as lighter fraction.

It will be understood that an intermediate fraction only can be withdrawn from compartments 14 and 114 where desirable by opening valves 66 and 166 for a time interval just sufficient to eject or withdraw the intermediate fraction.

It will be evident that section 12 and section 112 of the previously described modifications can be made of flexible plastic material while sections 10 and 110 are formed of rigid material. Additionally, all the sections may be formed of flexible plastic material so long as the valve carrying structure is formed of rigid material and held in proper position during centrifuging by engagement with the centrifuge. Of course, in such case the bottle of FIGURES 8 and 9 would have to be supported during centrifuging at the open end of the cup 216.

Referring now to the embodiment of the invention illustrated in FIGURES 13 to 19, inclusive, there is shown a hand portable container of simplified construction. This bottle is made up of two sections 210' and 212' enclosing compartments 214' and 216', respectively. The main compartment 214' is for the reception, centrifugal separation, storage and dispensing of fresh whole human blood or fraction thereof as in the previously described embodiment. At the upper end of section 210' is neck 218' closed by a penetrable self-sealing plug 220' which in turn is covered by a metal seal or cap 222'.

Sections 210' and 212' are separable from one another and are held together by a bayonet type connection. This connecting means is formed by spaced lugs 224' on the top face of lower section 212' and complementary lug receiving openings carried by the bottom face of upper section 210'. In the latter case, an integral annular ring 226' is formed on the lower face of the upper section 210' and this ring has notches 228 and camming slots 230 for receiving and frictionally holding lugs 224' in the conventional manner of bayonet connections. The foregoing connecting means between sections 210' and 212' hold these sections against relative rotation, but in order to assure such a connection an adhesive tape 232 may be applied around the bottle in overlapping relation to both sections.

A pair of openings 234 are formed in the bottom of compartment 214' in identical radially spaced relation with respect to the vertical central axis of the bottle. In the top of bottom section 212' an opening 238 is formed. Openings 234 and 238 are parts of a continuous passageway between compartment 214' and compartment 216', which passageway includes a length of flexible tubing 240 and integral adapter connections on the opposed faces of sections 210' and 212'. The adapter on the bottom face of section 210' is in the form of an integral conduit 242 connecting openings 234 with each other and an integral adapter 244 receiving one end of tube 240. On the top face of section 212' the adapter is in the form of an integral member 246 which happens to coincide circumferentially with one of the lugs 224'.

The bottom of compartment 214' also has an opening 248 on the central axis of the bottle. Compartment 216' has an opening 250 near its bottom and opening 250 and opening 248 form part of a continuous passageway which includes flexible tubing 252 and rigid pipe 254 within compartment 216'. This passage also includes a conduit 256 integral with the bottom of section 210', including an adapter section 258 receiving the end of flexible tube 252. At the section 212' end this same passage includes an adapter 260 receiving the end of flexible tube 252.

Within compartment 214' are three valves 262 for closing openings 234 and 248. These valves are carried by a rigid armature 264 which is mounted for vertical reciprocating movement on pins 266 slidably received within two cylindrical guideways 268 in the bottom of section 210'. This specific construction is best shown in FIGURES 18 and 19. The upper face of bottom of section 210' at each of these points includes an integral upstanding nipple 270 in order to give guideway 268 vertical length and the lower face is recessed at 272 to form a downwardly extending annular neck 274 within the recess. Each pin 266 has a neck 276 at the point of juncture with the armature. An elastic and impermeable sealing element 278 separately shown in FIGURE 19 has an upper neck gripping portion 280 and a lower neck gripping portion 282 which resiliently and sealingly engage necks 276 and 274, respectively. Since element 278 is resilient in nature, it elongates to permit vertical sliding movement of pin 266 in guideway 268 while retaining its sealing grip on necks 274 and 276. The resiliency of this element acts to bias armature 264 downwardly into valve closing position. In order to open valves 234 and 248, a valve actuator 284 is included within section 212'. Valve actuator 284 is slidably received within a cylindrical cavity 286 centrally located in section 212' with the lower end accessible from the exterior of the bottle. The upper end of valve actuator 284 has a yoke portion 288 including two pins 290 which project up into guideways 268. The yoke of the valve actuator is so dimensioned that on upward movement of the actuator the pins move upwardly into guideways 268 and move armature pins 266 upwardly against the resilience of sealing members 278 to thereby open valves 234 and 248. Where a bayonet type connection is used between the upper and lower sections of the bottle, as in the present case, the upper end of cavity 268 must be shaped as at 292 so as to permit the necessary relative rotation of bottom section 212' of the bottle without disturbing the mating relation of elements 290 and guideways 268. It will be understood that the duplication of valves 234 and the resulting elongated shape of armature 264 are not essential to the bottle's operation but are a convenient way of balancing these moving parts. Where desired armature 264 may be moved to valve opening position by means other than pins 290 so that all moving parts are sealed within section 210', e.g., by magnetic means acting through the bottom wall of section 210'.

A bail 294 is included within the recess formed on the bottom of section 210' by ring 226' and is used when this section of the bottle is being utilized for an infusion. Although section 210' has been termed the upper section in this description and section 212' the lower section, it will be apparent that the bottle can be inverted where desired.

An example of the use of a bottle of the form illustrated in FIGURES 13 to 19, inclusive, will now be described in connection with the handling of blood.

The stoppered and pyrogen-free bottle with the parts assembled as shown in FIGURE 13, including adhesive tape 232, is stored ready for use when needed. Such a bottle would have been previously sterilized. It would also usually have been evacuated with valves 234 and 248 held open during the evacuation process. The sterilized, evacuated and sealed bottles may be stored in large numbers in hospitals and other blood donor centers.

The bottle is used for a phlebotomy in the same manner as a conventional bottle. The blood collects in compartment 214' and cannot flow into compartment 216' because valves 234 and 248 are maintained in closed position by the resiliency of element 278. The bottle may now be put into a conventional centrifuge, preferably in an inverted position, and is spun about its vertical axis for the usual period of time and at the usual speed. During this centrifuging operation the blood is held against the inside walls of section 210' and under the influence of centrifugal force the red cells migrate radially outwardly toward the side walls. The plasma and platelets are thereby forced inwardly toward the axis of rotation. The time comes during centrifuging when the red cells, together with some white cells, have collected in an annular body hugging the side wall of section 210' and the plasma and platelets have collected in an annular body disposed inwardly thereof with a more or less definite cylindrical interface between the two bodies, as explained above. Each opening 234 is positioned so that it is disposed radially inwardly of the body of red cells, a distance equal to the thickness of a safety layer of plasma to assure the absence of red cells over the opening. At this time, the attendant inserts any convenient device into cavity 286 and pushes down on valve actuator 284 to institute the second phase of the centrifuging. This opens valves 234 and 248, placing the compartment 216' in communication with the compartment 214'. The centrifugal forces acting on and within the body of the liquid in compartment 214' force all the liquid disposed radially inwardly of openings 234 into compartment 216'. Valves 234 may then be closed. A separation of red cells and plasma has been thus accomplished and if this is the desired end centrifuging is terminated. If platelets are desired, the centrifuging may then be continued in a third phase at the same speed for a period of time or at a higher speed for a shorter period of time in order to separate the platelets. When the platelets have collected on the side walls of section 212' the centrifuging can be stopped. If the plasma is to be separately stored, valves 234 and 248 will be left closed. Otherwise, they can be left open during the third phase of the centrifuging or reopened at any time after stopping the centrifuge. The plasma drains back into compartment 214' to mix with the red cells and any white cells therein. In either case, before separating the two sections of the bottle, valves 234 and 248 are allowed to close. Adhesive tape 232, if present, is removed. The tubes 240 and 252 are clamped off and then cut as previously described in respect to FIGURES 1–16, inclusive. Then, either or both sections of the bottle can be separately used immediately or separately stored.

It will be apparent that all the description of the advantages and uses of the embodiment illustrated in FIGURES 1–12, inclusive, apply to the embodiment illustrated in FIGURES 13–19, inclusive, and vice versa.

Since the bottle of FIGURES 1–7, inclusive, and 13–19, inclusive, must be spun coaxially at high speeds to carry out the centrifuging operations, it is advisable to design the bottle so that it is balanced in weight in respect to the axis of rotation. Thus, the axis of rotation should pass through at least the center of gravity of the bottle and preferably through the centers of gravity of the sections of the bottle. Small deviations of the center of gravity of the bottle or centers of gravity of the sections from the axis of rotation, as for example from the central vertical axis of the present bottle, will not deleteriously affect operation.

Referring to FIGURES 20–23, inclusive, an additional embodiment of the present invention is illustrated. In FIGURE 20, reference numeral 300 indicates generally a two-part blood bottle with the sections connected by a tubing. The parts of this bottle correspond functionally to those of the bottle of FIGURES 8 and 9 and therefore where possible, in order to simplify the description, corresponding functional equivalents in the bottle of FIGURE 20 are given identical reference numerals to those of FIGURES 8 and 9 plus 200. As is evident from the drawing, the bottle of FIGURE 20 is formed of preferably non-wetting, translucent flexible plastic sheeting. In view of this fact, no pressure equalizing means need be provided between compartments and a single valve and single tubing fulfill the functions of the double valves and double tubings disclosed in connection with the bottle of FIGURES 8 and 9.

The bottle of FIGURE 20 is formed in known manner from sheets of flexible plastic material with the edge portions welded. In order to introduce and withdraw liquids from compartments 314 and 316, self-sealing, hollow needle penetrable plugs 320 are carried in necks 318, although any suitable means can be supplied for this purpose. Neck 318 and plug 320 of section 312 may be omitted as in the bottle of FIGURES 8 and 9 if so desired. An opening 366 is presented in compartment 314 in a position corresponding to the opening 166 of the bottle of FIGURES 8 and 9. This opening is connected by a conduit 341 to flexible tubing 340 which in turn is received into section 312 and communicates with compartment 316 through opening 338. As best shown in FIGURE 23, the passageway formed by opening 366, conduit 341, tubing 340 and opening 338 is closed immediately adjacent opening 366 by a valve indicated generally at 370. The valve itself is made up of a plug 371 of magnetic material, slidable in a valve chamber 373 which may be part of conduit 341. At the lower end of the valve chamber is an annular valve seat 375, the upper end of the valve chamber being closed. Opening 366 communicates with the valve chamber through a sidewall. Spring 376 biases valve plug 371 into a normally closed position with an annular valve face 377 on the plug held in sealing relation with valve seat 375. The valve plug has a rear circular skirt 379 slidably but snugly fitting against the sidewalls of the valve chamber and a collector channel 381 communicating with passageway slots 383, the skirt and the valve seat both acting to block flow of liquid with the valve in closed position but the collector channel and passageways acting to conduct liquid through the valve when the valve is in open position.

As is conventional in the flexible bag form of bottles, margins 301 of the plastic material are heat sealed together and to fittings to form a closed bag. In the present case, in addition to conduit 341, solid welting members 303 are embedded in certain of these marginal portions between the sheets of plastic material for purposes to be described hereunder.

The bottle of this embodiment is adapted to be held in a centrifuge cup of the present invention illustrated in FIGURES 21 and 22 and centrifuged in the type of centrifuge illustrated in FIGURE 10. This cup is indicated generally by the reference numeral 400 and incorporates two chambers 402 and 404. Upper chamber 402 is hinged along one side edge to receive section 310 of bottle 300, section 312 of bottle 300 being received within chamber 404 of the cup. The internal sidewalls 406 and the internal bottom wall 408 of the upper chamber 402 of the cup are shaped to correspond to the lower half of section 310 of bottle 300 when compartment 314 has the desired amount of liquid to be fractionated. Thus, the bottom wall 408 is dished downwardly and merges into sidewalls 406 to form a rigid "mold" having the cross-sectional shape shown best in FIGURE 22, thereby to hold the body of liquid in the lower half of section 310 in a predetermined shape during centrifuging, provided section 310 is properly positioned within the cup. In order to hold bag section 310 in predetermined position during centrifuging, the ribs formed by conduit 341 and welting 303 are received in registering grooves 409 in the mating faces of the hinged sections of cup 400. Laterally disposed mating notches 411 are provided to receive and hold the laterally disposed short nipple 367 which forms opening 366 in compartment 310. Grooves 409 extend downwardly and open into chamber 404 to permit passage of tubing 340 thereinto when the hinged portions of chamber 402 are brought together in closed position.

A pair of lugs 413 are provided at the upper end of cup chamber 404 for a purpose to be described.

To operate valve 370 during centrifuging, an electromagnet 418 is provided and electrical winding 419 has one end grounded on the centrifuge at 421, the other end being connected to an electrical conductor 423 which in turn can be connected to a conventional insulated current collecting ring 430 on the rotor of the centrifuge and thence through stationary brush 432, manual switch 434, and conventional timer 436 to a source of current 438 grounded at 440 on the centrifuge. By means of the timer 436 or switch 434, magnet 418 can be energized during centrifuging. Since valve plug 370 is made of magnetic material and valve chamber 373 is not, the energized magnet will open the valve and hold it open so long as the magnet is energized.

Trunnion receiving slots 426 on the sides of cup 400 rotatably receive trunnions 424 of the centrifuge head 414 thereby locking the hinged cup in closed position.

The modification of FIGURES 20–23, inclusive, is utilized in the same manner as the previously described embodiments. In the case of handling blood, the blood from a donor or donor bottle is flowed by gravity, or in any suitable manner, through a hollow needle pierceable plug 320. Of course, a conventional tube and needle may be formed integrally with section 310 in place of neck and stopper 318, 320. By weighing or any other suitable manner, the desired quantity of blood is collected in compartment 314. Since valve 370 is normally biased into closed position, none of the blood passes over into plasma compartment 316. Bag section 310 with the desired amount of blood in it and with the phlebotomy needle removed is laid in the upper chamber 402 of cup 400, which can be horizontally disposed for this purpose, with the ribs formed by welts 303 and conduit 341 received by grooves 409 and nipple 367 received by notch 411. Plasma section 312 is inserted in flat condition in chamber 404 and to insure against tubing 340 becoming kinked, it is engaged around lugs 413. The hinged section of the cup is then closed on the bottle gripping the margins of section 310 as shown in FIGURE 22. On righting the cup, the shape of the internal walls of the lower half of chamber 402 constrains the lower half of bag section 310 to conform to a predetermined shape. This shape is such, taking into consideration a predetermined amount of blood (and anticoagulant, if used) in compartment 314, that opening 366 is at the desired position in respect to the fractionation process to follow. The cup is engaged with centrifuge head 414 and the bottle is ready to be centrifuged.

During the first phase of centrifugation, with cups 400 in the solid line position corresponding to that of cups 216 in FIGURE 10, migration of the red cells away from the axis of revolution takes place. When the desired segregation has been accomplished, electromagnet 418 is energized by timer or manually thereby opening valve 370. Since opening 366, as already explained in respect to the other modifications, is positioned immediately above the interface of the red cells and the plasma fraction, plasma fraction only is ejected through opening 366, conduit 341, tubing 340 and opening 338 into plasma compartment 316. Where desired, electromagnet 418 is then deenergized and valve 370 closes. If only plasma separation is desired, the centrifuge can then be stopped and the bottle removed. If platelet separation is desired, centrifugation may be continued and a platelet pack is deposited on an internal wall of compartment 316. If the plasma is to be returned to compartment 314 to form a reconstituted blood minus platelets, electromagnet 418 is energized and the cup inverted at the same time. The platelets can then be separately stored as explained above.

Referring to FIGURES 24–27, inclusive, a further embodiment of the present invention is illustrated which is similar to the embodiment illustrated in FIGURES 20–23, inclusive. In FIGURE 24, there is shown a two-part blood bottle with the sections connected by a tubing. The parts of this bottle correspond functionally to those of the embodiment of FIGURES 20–23, inclusive, except for the fact that there need be no valve carried by the bottle for sealing off the main compartment, except insofar as the flexible parts of the bottle constitute valve elements as will be apparent from the ensuing description. To simplify the description, corresponding functional equivalents in the bottle of FIGURE 24 have been given identical reference numerals plus 200 to those of FIGURE 20.

As in the case of the bottle of FIGURE 20, the bottle of FIGURE 24, indicated generally by reference numeral 500, is formed of flexible plastic sheeting and no pressure equalizing passage means is necessary between compartments. In this modification, a blood donor tube 505 terminating in a phlebotomy needle 507 is joined to the top of main section 510 so as to be in communication with compartment 514. Normally, needle 507 will be in a protective sheath before use. In this embodiment, opening 566 is in the top of the bag in the position illustrated in FIGURE 25 and may be centrally disposed relative to the longitudinal edges of section 510 although, as pointed out later, this opening can be to one side or the other of the mid-point of the top edge of section 510 and the centrifuge element cavities shaped accordingly. Tubing 540 which joins sections 510 and 512 of the bottle terminates at its upper end at opening 566 with a short section 542 received and welded into marginal portion 501 of section 510. Portion 542 of tubing 540 and the surrounding welded sheet plastic together constitute a flexible conduit which can be squeezed flat to form a closed valve and thus portion 542 can be considered a valve element. In the top and bottom welded marginal portions of sections 510 and 512 are pairs of small perforations 509 which are useful in hanging the bags when in use. Necks 518 and self-sealing needle puncturable stoppers 520 are shown closing bags 510 and 512 although any other convenient form of entry means can be used or none where tubing 540 is relied upon for reentry or access to compartments 514 and 516 of these bags, respectively.

The bottle of this embodiment is adapted to be held in a centrifuge cup or element illustrated in FIGURES 25–27, inclusive. This centrifuge element is indicated generally by the reference numeral 600 and incorporates two chambers 602 and 604 formed by complementary cavities carried in hinged sections 603 and 605. When hinged sections 603 and 605 are in closed position, the complementary cavities combine to form chambers 602 and 604 which correspond in configuration to sections 510 and 512, respectively, of the bottle when they contain liquid. The shape of chamber 602 to the left of the vertical centerline in FIGURE 25 is critical, this shape being the same as the corresponding portion of section 510 of the bottle when that portion of section 510 of the bottle holds packed red cells plus a thin safety layer of plasma.

Complementary grooves 609 come together to hold tubing 540 to prevent the same from becoming kinked. Chamber 604 is shaped to hold section 512 of the bottle when this section has received the plasma fraction during centrifuging but it can be larger in volume. Hinged sections 603 and 605 of centrifuge element 600 also include the necessary cavities to receive necks 518 and the stub end of tube 505. An air relief or bleed passage 613 is provided for a purpose to be described.

An important functional part of centrifuge element 600 is the means for holding valve portion 542 of bag section 510 so that it is accurately positioned during centrifuging. A convenient means for accomplishing this, in conjunction with portion 611 of recess 609, are pins 607 carried by centrifuge element 600 which are received in perforations 509 in the top marginal portion of bag section 510. It may also be advisable to hold both bag sections 510 and 512 in extended and stable position in chambers 602 and 604 and pairs of pins 650 acting in conjunction with the remaining perforations 509, accomplish this purpose. Cooperating with pins 607 and pins 650 are marginal portions 652 of element 600 at the ends of chambers 602 and 604 which receive and may grip the end marginal portions of bag sections 510 and 512 when the centrifuge element 600 is closed on a bottle. Where desired, it will be obvious that side marginal portions of the bag sections may also be gripped in similar manner but, to simplify the drawing, this feature has been omitted. It is to be noted that the important relationship between bag section 510 and chamber 602 is the rigid positioning of opening 566 and the valve element formed by tube section 542 during centrifuging. This and the volumetric shape of the left half of chamber 602 in FIGURE 25 will constrain the bag section to hold the critical volume of liquid during centrifuging and permit transfer of the remainder of the liquid at the proper time. If opening 566 is not at the mid-point of margin 501, chamber 602 must be shaped differently to accomplish the same purpose.

Valve element 542 of bag section 510 being received by mating portions 611 of recess 609, the remainder of the valve combination is carried by centrifuge element section 603 at this same point.

The valve operator part of the valve combination, indicated generally at 655, is recessed into the side of centrifuge element section 603. This unit comprises a finger-operated plunger 656 having a resilient nose 657 spring-pressed into extended position by a spring 658. Plunger 656 is slidably received in a borehole 659 opening at recess 611. Inspection of FIGURE 28 will show that plunger 656 can be manually depressed to squeeze tube section 542 into a closed position and in this extreme position latch member 660 is urged by spring 661 into notch 662 in plunger 656 to thereby hold plunger 656 in valve closing position. A spring-pressed detent 663 limits the extreme outward position of plunger 656. Latch 660 terminates in an armature 664 of solenoid 665, the solenoid coil being grounded on one side on the centrifuge element and having a power supply line 666. As in the centrifuge cup of FIGURE 22, the power supply line goes to a collector ring and brush on the centrifuge and thence to a power supply through a switch and timer, whereby solenoid 665 can be operated at the desired time during centrifuging. When power is supplied to the solenoid, latch member 660 is drawn away from plunger 656 permitting the plunger to be moved outwardly by the resilience of tube section 542, thereby opening the valve.

The embodiment of the invention illustrated in FIGURES 24 to 27, inclusive, is operated in a manner similar to that of FIGURES 20 to 23, inclusive, the principal difference being that the two section bottle shown in FIGURE 24 need have no valve in normally closed position in the neighborhood of reference numeral 542. After the phlebotomy needle 507 has been used to collect the requisite amount of blood from a donor, tubing 505 is sealed by heat or in any other desirable manner close to bottle section 510 and severed on the side of the seal point away from the bag. While collecting the blood, bag section 510 is suspended upright in the position shown in FIGURE 24 and is maintained in this position while being placed in the cavity 602 of section 603 of the centrifuge element. If more convenient, tubing 540 can be clamped or temporarily blocked at or immediately adjacent section 542 while the full bag is being handled and placed in the centrifuge element. Of course, if desired, the means for blocking section 542 can be actuated during contrifuging as in FIGURE 20 but this would be an obvious variation of the earlier described form. In any event, in the present form, at the time the centrifuge element is closed on the bag, section 510 is maintained in upright position so that no blood will pass into tube 540. In loading the two section bottle into the centrifuge element, section 510 and section 512 are positioned by inserting pins 607, 607 through the associated perforations 509 and the remaining pins 650 through their associated perforations 509. On closing the centrifuge element 600 on the bag sections and placing it in the centrifuge, the centrifuge arms lock the hinged sections in closed position. Plunger 656 is then depressed into valve closing position. This means that the resilient nose 657 of the plunger squeezes tube section 542 into a configuration in which the walls of the tube are in contact and a closed valve is formed at opening 556 of bottle section 510. The necessary electrical connection with conduit 666 is made and the centrifuge can be started.

As has been explained above, depending upon the position of opening 566, the two complementary cavities of chamber 602 are shaped to conform to the shape of the part of bag section 510 to the left of a plane passing through opening 566 and parallel to the axis of revolution so that this section of the bag when expanded by hydrostatic pressure due to centrifugation will exactly hold the red cell fraction plus a safety layer of plasma, all as has been pointed out above in respect to the preceding described modifications.

When the desired red cell fraction and plasma fraction have been separated, the switch corresponding to switch 434 of FIGURE 22 is closed, or timer 436 is used to close the circuit. Solenoid 665 actuates armature 664 to disengage latch 660 from notch 662 and plunger 656 is impelled outwardly by the resilience of tube section 542. The hydrostatic forces present in the plasma fraction ejects this plasma fraction through opening 566 and tube 540 into compartment 516 of section 512 of the bottle. Air bleed port 613 permits trapped air in cavity 604 to escape. If plasma fraction separation, with or without platelets, is all that is desired, the centrifuge can be stopped. Centrifuge element 600 is turned into the position shown in FIGURE 25, opened and the bag sections removed. Tube 540 can be sealed or clamped in two places and severed in between and the two separated bottle sections separately stored.

Where the separated plasma fraction in compartment 514 includes the platelets and a separate platelet pack is desired, centrifugation is continued without stopping at the same or higher speed for the time period necessary to adhere the platelets to the interior walls of compartment 516. As in the case of the embodiments of FIGURES 8 and 20, the fact that bottle section 512 is farther removed from the axis of revolution results in higher centrifugal forces being applied to the plasma fraction, whereby the platelet pack can be collected at a lower speed or shorter time period or both than those embodiments where the platelet containing fraction is centrifuged closer to the axis of revolution.

It will be obvious from the foregoing description of the modifications illustrated in FIGURES 20–27, inclusive, that the bag or flexible bottle sections 310, 312, 510 and 512 could equally well be held in the centrifuge elements in spaced parallel planes instead of in alignment as shown in these figures. This obvious variation is diagrammatically illustrated in FIGURE 28 where similar reference numerals indicate similar parts to those of FIGURES 24–27, inclusive, but with the initial digit of higher order. With the blood bottle section centrifuged in this flat position, the more dense constituents, such as the red cells and platelets, have a shorter distance to go through liquid and the centrifuging time or speed can be reduced.

It will be understood that in the modifications of FIGURES 20–28, inclusive, the center of gravity of the centrifuge element and contained bag must be designed so that the interface between the separated red cell fraction and plasma fraction lies in a plane properly positioned with respect to openings 366, 566 and 766.

In all embodiments illustrated the position of openings such as 66, 166, 366, 434, 566 and 766 is purely diagrammatic and can vary depending on the liquid mixture being fractionated. The position of these openings where blood is being handled has been described in this specification.

The terminology "concentric to an axis" as used in this specification and claims in referring to the sidewalls of a container or bottle is intended to embrace any wall structure which coincides with a continuous surface generated by points rotating in circles in an infinite number of planes normal to the axis, with the centers of the circles lying along the axis of revolution, each such plane passing through the continuous surface only once.

The terms "revolve" and "revolution" are used herein to embrace both the turning of a body around an axis outside the body and the turning of a body about an axis passing through the body while the terms "rotate" and "rotation" are used to designate only turning of a body around an axis passing through the body. Where the term "density" is used in respect to the liquids being handled, apparent density is included within the meaning of the term since, as has been pointed out earlier, blood comprises solid particles suspended in colloidal plasma. The term "hydrostatic head" as used herein means the hydrostatic pressure present at a point in a body of liquid due to the weight of the liquid acting at that point, whether the weight is due solely to gravity or to the resultant of centrifugal force and gravity, the resultant being specifically referred to as the "centrifugal hydrostatic head."

We claim:
1. The method of separating liquid mixtures into fractions of greater density and lesser density comprising the steps of:
 (a) providing a centrifuge having a container receiving member revolvable around an axis of revolution,
 (b) providing a container separate from the centrifuge having a first compartment containing a discrete body of liquid mixture and a second compartment, the compartments being interconnected by passageway means,
 (c) placing the container in the container receiving member of the centrifuge, with both compartments held by the member for synchronous revolution around the axis of revolution, and with the discrete body of liquid mixture confined to the first compartment,
 (d) revolving the container receiving member and both of the compartments synchronously around the axis of revolution for a period of time until the discrete body of liquid mixture forms within the first compartment a first fractional liquid body of more dense fraction resting against a wall of the first compartment remote from the axis of revolution and a second fractional liquid body of less dense fraction supported by the first fractional liquid body and between the first fractional liquid body and the axis of revolution,
 (e) then while continuing to revolve the container around the axis of revolution initiating movement of one liquid fraction out of the first compartment through the passageway means into the synchronously revolving second compartment,
 (f) terminating movement of liquid fraction out of the the first compartment to retain at least part of the other liquid fraction in the first compartment,
 (g) collecting liquid fraction in the second compartment during revolution of the container and holding the collected liquid fraction within the second compartment on cessation of revolution.

2. The method as claimed in claim 1 in which the container receiving member is rotatable and is rotated around an axis of rotation.

3. The method claimed in claim 1 in which the axis of revolution is outside the container.

4. The method of separating liquid mixtures into fractions of greater density and lesser density comprising the steps of:
   (a) providing a centrifuge having a container receiving member revolvable around an axis of revolution,
   (b) providing a container separate from the centrifuge having a first compartment containing a discrete body of liquid mixture and a second compartment, the compartments being interconnected by passageway means,
   (c) placing the container in the container receiving member of the centrifuge, with both compartments held by the member for synchronous revolution around the axis of revolution, and with the discrete body of liquid mixture confined to the first compartment,
   (d) revolving the container receiving member and both of the compartments synchronously around the axis of revolution for a period of time until the discrete body of liquid mixture forms within the first compartment a first fractional liquid body of more dense fraction resting against a wall of the first compartment remote from the axis of revolution and a second fractional liquid body of less dense fraction supported by the first fractional liquid body and between the first fractional liquid body and the axis of revolution,
   (e) then while continuing to revolve the container around the axis of revolution to maintain the first fractional liquid body against the wall of the first compartment by centrifugal force, selectively transferring less dense fraction from the first compartment through the passageway means to the synchronously revolving second compartment,
   (f) collecting less dense fraction in the second compartment during revolution of the container and holding the collected less dense fraction within the second compartment on cessation of revolution.

5. The method of separating liquid mixtures into fractions of greater density and lesser density comprising the steps of:
   (a) providing a centrifuge having a container receiving member revolvable around an axis of revolution,
   (b) providing a container separate from the centrifuge having a first compartment containing a discrete body of liquid mixture and a second compartment, the compartments being interconnected by passageway means,
   (c) placing the container in the container receiving member of the centrifuge, with both compartments held by the member for synchronous revolution round the axis of revolution, and with the discrete body of liquid mixture confined to the first compartment,
   (d) revolving the container receiving member and both of the compartments synchronously around the axis of revolution for a period of time until the discrete body of liquid mixture forms within the first compartment a first fractional liquid body of more dense fraction resting against a wall of the first compartment remote from the axis of revolution and a second fractional liquid body of less dense fraction supported by the first fractional liquid body and between the first fractional liquid body and the axis of revolution,
   (e) then while continuing to revolve the container around the axis of revolution to maintain the first fractional liquid body against the wall of the first compartment by centrifugal force, utilizing centrifugal hydrostatic head at a point contiguous to the interface between the first fractional liquid body and the second fractional liquid body to move liquid fraction out of the first compartment through the passageway means into the synchronously revolving second compartment,
   (f) collecting liquid fraction in the second compartment during revolution of the container and holding the collected liquid fraction within the second compartment on cessation of revolution.

6. The method of separating a particulate material of intermediate density from a liquid mixture containing a more dense fraction and a less dense fraction and said particulate material comprising the steps of:
   (a) providing a centrifuge having a container receiving member revolvable around an axis of revolution,
   (b) providing a container separate from the centrifuge having a first compartment containing a discrete body of the liquid mixture and a second compartment, the compartments being interconnected by passageway means,
   (c) placing the container in the container receiving member of the centrifuge with both compartments and passageway means held by the member for synchronous revolution around the axis of revolution, and with the discrete body of liquid mixture confined to the first compartment,
   (d) revolving the container receiving member and both of the compartments synchronously around the axis of revolution for a period of time until the discrete body of liquid mixture forms within the first compartment a first fractional liquid body of more dense fraction resting against a wall of the first compartment remote from the axis of revolution and a second fractional liquid body of less dense fraction and said particulate material supported by the first fractional liquid body and between the first fractional liquid body and the axis of revolution,
   (e) then while continuing to revolve the container around the axis of revolution to maintain the first fractional liquid body against the wall of the first compartment by centrifugal force, selectively transferring less dense fraction and said particulate material from the first compartment to the synchronously revolving second compartment,
   (f) then revolving the second compartment to separate and deposit said particulate material against a wall of the second compartment remote from the axis of revolution, and
   (g) withdrawing less dense fraction minus said particulate material from the second compartment.

7. Apparatus for separating liquid mixtures into fractions of greater density and lesser density comprising:
   (a) a centrifuge having a container holding member which revolves around an axis of revolution,
   (b) a container having a first liquid holding compartment, a second liquid holding compartment and a liquid conducting passageway means interconnecting the compartments,
   (c) means carried by the container holding member holding the first compartment, the second compartment and the passageway means for synchronous revolution around the axis of revolution,
   (d) means associated with the means claimed in (c) for releasing the container for separation of the container from the container holding member,
   (e) means associated with the first compartment for holding and confining a discrete body of liquid mixture entirely within the first compartment during centrifuging,
   (f) wall means associated with the means claimed in (e) for holding the discrete body of liquid mixture during centrifuging to form a first fractional liquid body of more dense fraction held against a portion of the wall means remote from the axis of revolution and a second fractional liquid body of less dense fraction supported by the first fractional liquid body and a second portion of the wall means between the first fractional liquid body and the axis of revolution, (g) means actuated after the first and second fractional liquid bodies have formed placing the passageway means in communication with the liquid fraction at a point in one of the fractional liquid bodies, (h) means associated with the container holding member positioning the passageway means and at least a portion of the second compartment not substantially closer to the axis of revolution than the point at which the passageway means is in communication with the liquid fraction in the first compartment whereby liquid fraction moves from the first compartment through the passageway means into the second compartment, (i) means causing a cessation of movement of liquid fraction through the passageway means when a predetermined flow of liquid has taken place, and (j) means associated with the second compartment for collecting the liquid fraction during centrifuging and holding the collected liquid fraction on cessation of centrifuging.

8. The apparatus of claim 7 in which the container holding member is rotatable and rotates around an axis of rotation.

9. The apparatus of claim 7 in which the container holding member revolves around an axis of revolution outside the container.

10. Apparatus for separating liquid mixtures into fractions of greater density and lesser density comprising:

(a) a centrifuge having a container holding member which revolves around an axis of revolution, (b) a container having a first liquid holding compartment, a second liquid holding compartment and a liquid conducting passageway means interconnecting the compartments, (c) means carried by the container holding member holding the first compartment, the second compartment and the passageway means for synchronous revolution around the axis of revolution, (d) means associated with the means claimed in (c) for releasing the container for separation of the container from the container holding member, (e) means associated with the first compartment for holding and confining a discrete body of liquid mixture entirely within the first compartment during revolution, (f) wall means associated with the means claimed in (e) for holding the discrete body of liquid mixture during revolution to form a first fractional liquid body of more dense fraction held against a portion of the wall means remote from the axis of revolution and a second fractional liquid body of less dense fraction supported by the first fractional liquid body and a second portion of the wall means between the first fractional liquid body and the axis of revolution, (g) means actuated after the first and second fractional liquid bodies have formed placing the passageway means in communication with a liquid fraction at a point in one of the fractional liquid bodies contiguous to the interface between the first and second fractional liquid bodies, (h) means associated with the container holding member positioning the passageway means and at least a portion of the second compartment not substantially closer to the axis of revolution than the point at which the passageway means is in communication with the liquid fraction in the first compartment whereby liquid fraction moves from the first compartment through the passageway means into the second compartment, (i) means causing a cessation of movement of liquid fraction through the passageway means when a predetermined flow of liquid has taken place, and (j) means associated with the second compartment for collecting the liquid fraction during centrifuging and holding the collected liquid fraction on cessation of centrifuging.

11. Apparatus for separating liquid mixtures into fractions of greater density and lesser density comprising:

(a) a centrifuge having a container holding member which revolves around an axis of revolution, (b) a container having a first liquid holding compartment, a second liquid holding compartment and a liquid conducting passageway means interconnecting the compartments, (c) means carried by the container holding member holding the first compartment, the second compartment and the passageway means for synchronous revolution around the axis of revolution, (d) means associated with the means claimed in (c) for releasing the container for separation of the container from the container holding member, (e) means associated with the first compartment for holding and confining a discrete body of liquid mixture entirely within the first compartment during revolution, (f) wall means associated with the means claimed in (e) for holding the discrete body of liquid mixture during revolution to form a first fractional liquid body of more dense fraction held against a portion of the wall means remote from the axis of revolution and a second fractional liquid body of less dense fraction supported by the first fractional liquid body and a second portion of the wall means between the first fractional liquid body and the axis of revolution, (g) means actuated after the first and second fractional liquid bodies have formed placing the passageway means in communication with the liquid fraction at a point in the second fractional liquid body, (h) means associated with the container holding member positioning the passageway means and at least a portion of the second compartment not substantially closer to the axis of revolution than the point at which the passageway means is in communication with the liquid fraction in the first compartment whereby less dense liquid fraction moves from the first compartment through the passageway means into the second compartment, (i) means causing a cessation of movement of liquid fraction through the passageway means when a predetermined flow of liquid has taken place, and (j) means associated with the second compartment for collecting the liquid fraction during centrifuging and holding the collected liquid fraction on cessation of centrifuging.

12. A device for centrifuging liquid mixtures of a plurality of constituents of different densities to separate fractions of different densities comprising:

(a) a body including a first section and a second section, (b) connecting means holding the sections in relative nonrotatable relation and in axial alignment with each other and with an axis of rotation, (c) a main compartment in the first section having walls concentric to the axis of rotation, (d) a second compartment in the second section, (e) wall means forming a fluid-tight barrier preventing movement of fluids between the main compartment and the second compartment, (f) an opening in the main compartment for communication with the second compartment, (g) the entire opening in the main compartment being radially spaced a distance from the axis of rotation, said distance being less than the distance from the axis of rotation to the farthest point in the main compartment, (h) an opening in the second compartment for communication with the main compartment, the opening in the second compartment being radially spaced a distance from the axis of rotation not substantially less than the first claimed distance, (i) means connecting the two openings and forming therewith a continuous passageway, the continuous passageway being at all points spaced a distance from the axis of rotation not substantially less than the first claimed distance, (j) means closing the passageway contiguous to the opening in the main compartment, means actuatable to open the passageway, and (k) means for actuating the last claimed means during centrifuging.

13. A device as claimed in claim 12 in which the main compartment and the second compartment each have closure means making a closed fluid-tight compartment.

14. A device as claimed in claim 13 in which:
(a) means are associated with the connecting means which are operable to separate the sections, and
(b) the means connecting the two openings include flexible tubing forming at least part of the passageway.

15. A device for centrifuging liquid mixtures of a plurality of constituents of different densities to separate fractions of different densities comprising:
(a) a body including a first section and a second section,
(b) connecting means holding the sections in relative nonrotatable relation and in axial alignment with each other and with an axis of rotation,
(c) a main compartment in the first section having walls concentric to the axis of rotation,
(d) a second compartment in the second section,
(e) wall means forming a fluid-tight barrier between the main compartment and the second compartment,
(f) an opening in the main compartment for communication with the second compartment,
(g) an opening in the second compartment for communication with the main compartment,
(h) means connecting the openings and forming therewith a continuous passageway,
(i) valve means closing the passageway contiguous to the opening in the main compartment, the valve means closing the passageway in the direction of pressure within the main compartment,
(j) means actuatable against pressure in the main compartment to open the valve means, and
(k) means for actuating the last claimed means during centrifuging.

16. A device as claimed in claim 15 in which the main compartment and the second compartment each have closure means making a closed fluid-tight compartment.

17. A device as claimed in claim 16 in which:
(a) means are associated with the connecting means which are operable to separate the sections, and
(b) the means connecting the two openings include flexible tubing forming at least part of the passageway.

18. In apparatus for separating liquid mixtures into fractions of greater density and lesser density in which a first compartment of a plural compartment container initially holds a body of the liquid mixture to be fractionated in a liquid holding portion thereof and a passageway means connects an outlet opening in the first compartment with an inlet opening in a second compartment in the container, the combination comprising:
(a) a centrifuge member for revolution around an axis of revolution,
(b) means associated with the centrifuge member for holding the first compartment, the second compartment and the passageway means of a said container for synchronous revolution around the axis of revolution,
(c) means associated with the centrifuge member for holding the first compartment, the second compartment and the passageway means of the container against removal during centrifuging,
(d) means associated with the centrifuge member for releasing the first compartment, the second compartment and the passageway means from the centrifuge member when the centrifuge member is not being revolved.
(e) means associated with the centrifuge member for positioning the liquid holding portion of the first compartment during centrifuging so that the body of liquid mixture forms a first fractional liquid body of more dense fraction held against a first wall portion of the first compartment remote from the axis of revolution and a second fractional liquid body of less dense fraction supported by the first fractional liquid body and a second wall portion of the first compartment,
(f) means associated with means (e) for positioning the outlet opening in one of the fractional liquid bodies after the first and second fractional liquid bodies have formed,
(g) means associated with the centrifuge member actuatable after the first and second fractional liquid bodies have formed to place the interior of the second compartment in communication with the interior of the first compartment through the passageway means during centrifuging,
(h) means associated with the centrifuge member for positioning the plural compartment container following actuation of means (g) to cause movement of liquid fraction through the passageway means during centrifuging,
(i) means associated with the centrifuge member for positioning the plural compartment container to cause cessation of movement of liquid fraction through the passageway means during centrifuging when a predetermined flow of liquid has taken place, and
(j) means associated with the centrifuge member positioning the second compartment so as to collect the liquid fraction during centrifuging and hold the collected liquid fraction on cessation of centrifuging.

19. An apparatus as claimed in claim 18 in which the outlet opening in the first compartment of the plural compartment container is initially closed by valve means and the combination comprises a valve operator associated with means (g) for opening said valve means.

20. The combination claimed in claim 18 in which the passageway means adjacent the outlet opening is in the form of a collapsible tubing and the combination comprises means associated with means (e) for placing pressure on the tubing to collapse the tubing and means associated with means (g) for removing pressure from the tubing.

21. In apparatus for separating liquid mixtures into fractions of greater density and lesser density in which a first compartment of a plural compartment container initially holds a body of the liquid mixture to be fractionated in a liquid holding portion thereof and a passageway means connects an outlet opening in the first compartment with an inlet opening in a second compartment in the container, the combination comprising:
(a) a centrifuge member for revolution around an axis of revolution,
(b) means associated with the centrifuge member for holding the first compartment, the second compartment and the passageway means of a said container for synchronous revolution around the axis of revolution,
(c) means associated with the centrifuge member for holding the first compartment, the second compartment and the passageway means of the container against removal during centrifuging,
(d) means associated with the centrifuge member for releasing the first compartment, the second compartment and the passageway means from the centrifuge member when the centrifuge member is not being revolved, (e) means associated with the centrifuge member for positioning the liquid holding portion of the first compartment during centrifuging so that the body of liquid mixture forms a first fractional liquid body of more dense fraction held against a first wall portion of the first compartment remote from the axis of revolution and a second fractional liquid body of less dense fraction supported by the first fractional liquid body and a second wall portion of the first compartment, (f) rigid wall means associated with the means (e) for engaging and maintaining said first and second wall portions of the liquid holding portion of the first compartment of the container in predetermined shape against hydrostatic pressure in the body of liquid mixture during centrifuging, (g) means associated with the rigid wall means (f) for positioning the outlet opening in one of the fractional liquid bodies during centrifuging after the first and second fractional liquid bodies have formed, (h) means associated with the centrifuge member for positioning the passageway means, the inlet opening and at least a portion of the second compartment during centrifuging not substantially closer to the axis of revolution than the point at which the outlet opening and the passageway means are in communication with the liquid fraction in the first compartment whereby liquid fraction can be moved from the first compartment through the passageway means and the inlet opening into the second compartment during centrifuging, (i) means associated with the centrifuge member actuatable after the first and second fractional liquid bodies have formed to place the interior of the second compartment in communication with the interior of the first compartment through the passageway means during centrifuging, (j) means associated with the centrifuge member for positioning the plural compartment container following actuation of means (i) to cause movement of liquid fraction through the passageway means during centrifuging, (k) means associated with means (j) for positioning the plural compartment container to cause cessation of movement of liquid fraction through the passageway means during centrifuging when a predetermined flow of liquid has taken place, and (l) means associated with means (h) positioning the second compartment so as to collect the liquid fraction during centrifuging and hold the collected liquid fraction on cessation of centrifuging.

References Cited by the Examiner
UNITED STATES PATENTS

| | | | |
|---|---|---|---|
| 1,098,653 | 6/14 | Whisenant | 215—1 |
| 1,132,814 | 3/15 | Aronson | 233—20 |
| 1,296,399 | 3/19 | Johansson | 233—27 |
| 1,364,763 | 1/21 | Houghton | 215—1 |
| 1,534,604 | 4/25 | Ter Mer | 233—47 |
| 2,362,025 | 11/44 | Price | 128—214 |
| 2,461,129 | 2/49 | Strezynski | 233—46 X |
| 2,461,674 | 2/49 | Weston et al. | 233—28 |
| 2,533,806 | 12/50 | Holzapfel | 220—20.5 X |
| 2,636,646 | 4/53 | Olsen | 220—20.5 X |
| 2,678,159 | 5/54 | Ellis | 233—27 X |
| 2,702,034 | 2/55 | Walter | 128—214 |
| 2,755,991 | 7/56 | Tholl et al. | 233—10 |
| 2,822,126 | 2/58 | Cohn | 233—46 X |
| 2,848,995 | 8/58 | Ryan | 128—214 |
| 2,854,143 | 9/58 | Novak | 233—26 X |
| 2,906,451 | 9/59 | Tullis et al. | 233—27 |
| 3,064,647 | 11/62 | Earl. | |

HARRY B. THORNTON, *Primary Examiner.*

HERBERT L. MARTIN, HERMAN BERMAN, *Examiners.*